(12) United States Patent
Santoro et al.

(10) Patent No.: US 10,215,344 B2
(45) Date of Patent: Feb. 26, 2019

(54) LIGHT EMITTING PANEL ASSEMBLIES AND LIGHT GUIDES THEREFOR

(71) Applicant: Fluxwerx Illumination Inc., Delta (CA)

(72) Inventors: Scott Santoro, Delta (CA); Timothy Edward Berman, Langley (CA)

(73) Assignee: Fluxwerx Illumination Inc., Surrey (CA)

( * ) Notice: Subject to any disclaimer, the term of this patent is extended or adjusted under 35 U.S.C. 154(b) by 595 days.

(21) Appl. No.: 14/382,716

(22) PCT Filed: Oct. 4, 2012

(86) PCT No.: PCT/CA2012/050700
§ 371 (c)(1),
(2) Date: Sep. 3, 2014

(87) PCT Pub. No.: WO2013/131167
PCT Pub. Date: Sep. 12, 2013

(65) Prior Publication Data
US 2015/0016141 A1    Jan. 15, 2015

Related U.S. Application Data

(60) Provisional application No. 61/606,739, filed on Mar. 5, 2012.

(51) Int. Cl.
*F21K 9/61* (2016.01)
*F21V 8/00* (2006.01)
(Continued)

(52) U.S. Cl.
CPC ............ *F21K 9/61* (2016.08); *G02B 6/003* (2013.01); *G02B 6/0016* (2013.01);
(Continued)

(58) Field of Classification Search
CPC ....... F21K 9/52; G02B 6/0016; G02B 6/0018; G02B 6/0038; F21V 2200/20
(Continued)

(56) References Cited

U.S. PATENT DOCUMENTS 5,005,108 A    4/1991   Pristash
5,165,187 A   11/1992   Shahidi-Hamedani
(Continued)

FOREIGN PATENT DOCUMENTS

CN       1952701 A    4/2007
CN    101151582 A    3/2008
(Continued)

*Primary Examiner* — Anh Mai
*Assistant Examiner* — Michael Chiang
(74) *Attorney, Agent, or Firm* — Oyen Wiggs Green & Mutala LLP

(57) ABSTRACT

A light emitting panel assembly is provided. The assembly includes: a light source; a transition area including a first major side and a second major side, wherein at least one of the first major side and the second major side includes a plurality of vertically extending flutes, wherein the flutes extend at least a portion of the height of the transition area; and an emission area in optical communication with the transition area, the emission area including light extraction elements.

23 Claims, 33 Drawing Sheets

(51) Int. Cl.
*F21Y 103/10* (2016.01)
*F21Y 115/10* (2016.01)

(52) U.S. Cl.
CPC ....... *F21V 2200/20* (2015.01); *F21Y 2103/10* (2016.08); *F21Y 2115/10* (2016.08); *G02B 6/002* (2013.01); *G02B 6/0028* (2013.01); *G02B 6/0068* (2013.01); *G02B 6/0073* (2013.01)

(58) Field of Classification Search
USPC .............................. 362/600–628, 61, 62, 65
See application file for complete search history.

(56) References Cited

U.S. PATENT DOCUMENTS

| | | | |
|---|---|---|---|
| 5,613,751 A | 3/1997 | Parker | |
| 5,618,096 A | 4/1997 | Parker | |
| 5,876,107 A | 3/1999 | Parker | |
| 5,915,855 A | 6/1999 | Murase | |
| 5,921,652 A | 7/1999 | Parker | |
| 6,030,089 A | 2/2000 | Parker | |
| 6,033,092 A | 3/2000 | Simon | |
| 6,048,081 A | 4/2000 | Richardson | |
| 6,079,838 A | 6/2000 | Parker | |
| 6,109,757 A | 8/2000 | Stephens | |
| 6,142,652 A | 11/2000 | Richardson | |
| 6,502,961 B1 | 1/2003 | Richardson | |
| 6,565,233 B1 | 5/2003 | Richardson | |
| 6,712,481 B2 | 3/2004 | Parker | |
| 6,749,312 B2 | 6/2004 | Parker | |
| 6,752,505 B2 | 6/2004 | Parker | |
| 6,827,456 B2 | 12/2004 | Parker | |
| 6,924,945 B1 | 8/2005 | Richardson | |
| 6,974,232 B1 | 12/2005 | Richardson | |
| 7,004,611 B2 | 2/2006 | Parker | |
| 7,090,389 B2 | 8/2006 | Parker | |
| 7,128,459 B2* | 10/2006 | Igarashi | G02B 6/0018 349/63 |
| 7,160,015 B2 | 1/2007 | Parker | |
| 7,165,873 B2 | 1/2007 | Parker | |
| 7,195,389 B2 | 3/2007 | Parker | |
| 7,226,196 B2 | 6/2007 | Parker | |
| 7,322,730 B2 | 1/2008 | Parker | |
| 7,354,184 B2 | 4/2008 | Parker | |
| 7,357,553 B2 | 4/2008 | Parker | |
| 7,364,341 B2 | 4/2008 | Parker | |
| 7,364,342 B2 | 4/2008 | Parker | |
| 7,367,705 B2 | 5/2008 | McCollum | |
| 7,374,305 B2 | 5/2008 | Parker | |
| 7,384,177 B2 | 6/2008 | Parker | |
| 7,404,660 B2 | 7/2008 | Parker | |
| 7,404,661 B2 | 7/2008 | Parker | |
| 7,434,973 B2 | 10/2008 | Parker | |
| 7,434,974 B2 | 10/2008 | Parker | |
| 7,467,887 B2 | 12/2008 | Parker | |
| 7,497,599 B2 | 3/2009 | Parker | |
| 7,513,672 B2 | 4/2009 | Parker | |
| 7,524,101 B2 | 4/2009 | Parker | |
| 7,537,370 B2 | 5/2009 | Parker | |
| 7,563,012 B2 | 7/2009 | Parker | |
| 7,667,238 B2 | 2/2010 | Erchak | |
| 7,712,932 B2 | 5/2010 | Parker | |
| 7,736,043 B2 | 6/2010 | Parker | |
| 7,780,329 B2 | 8/2010 | McCollum | |
| 7,798,695 B2 | 9/2010 | Parker | |
| 7,810,982 B2 | 10/2010 | Parker | |
| 7,875,218 B2 | 1/2011 | Parker | |
| 7,959,341 B2 | 6/2011 | Erchak | |
| 7,963,687 B2 | 6/2011 | Parker | |
| 8,029,708 B2 | 10/2011 | Parker | |
| 8,248,560 B2* | 8/2012 | Kim | G02B 6/0061 349/112 |
| 2003/0076669 A1* | 4/2003 | Itoh | G02B 6/0016 362/621 |
| 2004/0183774 A1* | 9/2004 | Manabe | G02B 6/0018 345/102 |
| 2005/0259939 A1* | 11/2005 | Rinko | G02B 6/0018 385/146 |
| 2006/0001037 A1* | 1/2006 | Schardt | G02B 6/0008 257/98 |
| 2007/0203267 A1 | 8/2007 | Richard | |
| 2010/0118519 A1* | 5/2010 | Yi | G02B 6/0038 362/97.3 |
| 2010/0142223 A1* | 6/2010 | Suckling | G02B 6/0038 362/615 |
| 2011/0255276 A1* | 10/2011 | Coward | F21V 14/02 362/217.02 |
| 2011/0286237 A1* | 11/2011 | Tanoue | G02B 6/0016 362/606 |
| 2011/0292318 A1* | 12/2011 | Nakamoto | G02B 6/0016 349/62 |
| 2013/0250618 A1* | 9/2013 | Nichol | G02B 6/0018 362/618 |

FOREIGN PATENT DOCUMENTS

| | | |
|---|---|---|
| CN | 101164006 A | 4/2008 |
| CN | 100432717 C | 11/2008 |
| CN | 101490604 A | 7/2009 |
| EP | 0751340 A2 | 1/1997 |
| EP | 0965789 A2 | 12/1999 |
| EP | 0965788 B1 | 2/2004 |
| EP | 1794639 A2 | 6/2007 |
| EP | 1451502 B1 | 5/2010 |
| EP | 1163473 B1 | 9/2010 |
| EP | 2244005 A1 | 10/2010 |
| EP | 1415110 B1 | 10/2014 |
| JP | 4272751 A | 1/2000 |
| JP | 4448252 B2 | 11/2002 |
| JP | 4349902 B2 | 3/2005 |
| JP | 2008515026 A | 5/2008 |
| JP | 2008519311 A | 6/2008 |
| JP | 4272752 B2 | 6/2009 |
| JP | 2009152207 A | 7/2009 |
| JP | 4378172 B2 | 12/2009 |
| JP | 2010056094 A | 3/2010 |
| JP | 2010056095 A | 3/2010 |
| KR | 1020040017341 A | 2/2004 |
| KR | 20050044695 A | 5/2005 |
| KR | 100729886 B1 | 6/2007 |
| KR | 1020070085643 A | 8/2007 |
| KR | 10-0961043 B1 | 6/2010 |
| KR | 1020100084704 A | 7/2010 |
| KR | 100979826 B1 | 9/2010 |
| KR | 100989695 B1 | 10/2010 |
| KR | 1020070061901 A | 12/2011 |
| TW | 1225543 B | 12/2004 |
| TW | 1243920 B | 11/2005 |
| TW | 1246576 B | 1/2006 |
| TW | 1266845 B | 11/2006 |
| TW | I333535 B | 11/2010 |
| TW | I362467 B | 4/2012 |

* cited by examiner

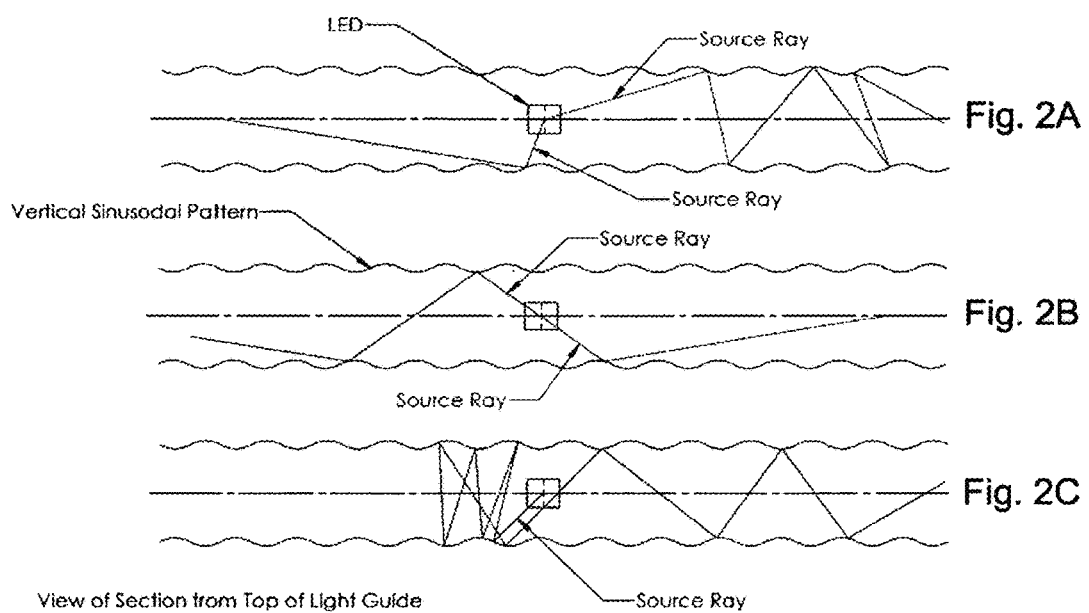

PRIOR ART

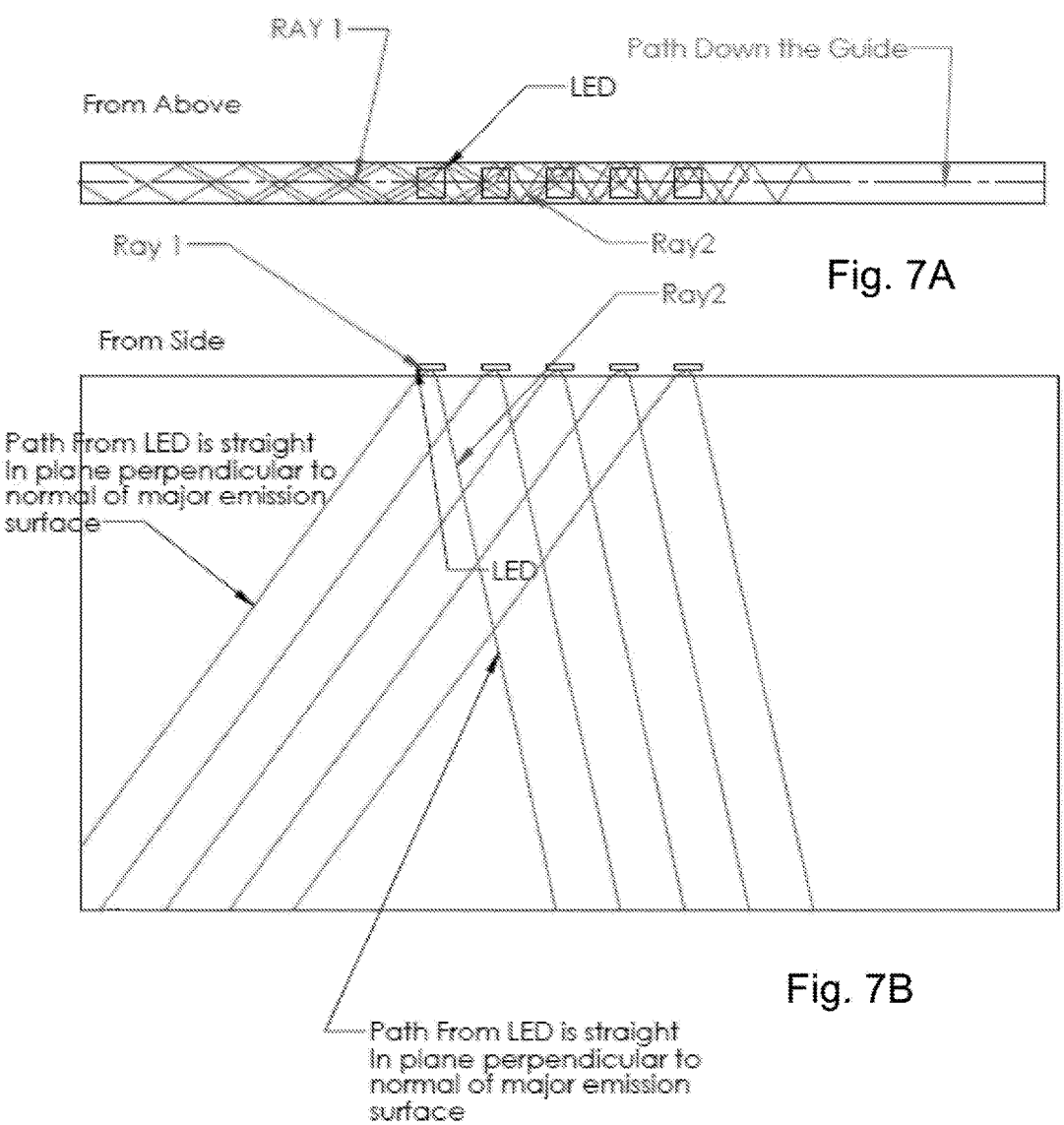

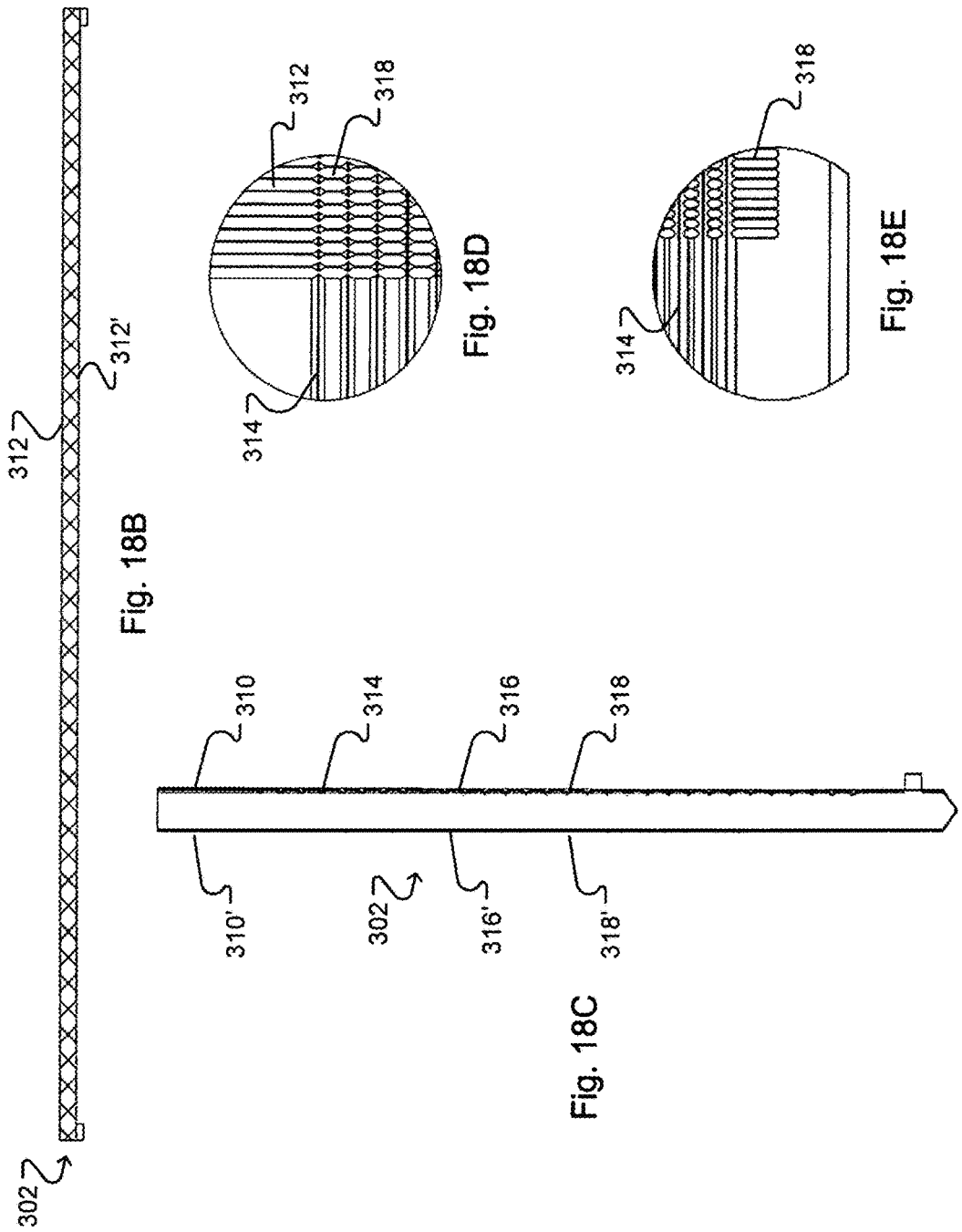

LIGHT EMITTING PANEL ASSEMBLIES AND LIGHT GUIDES THEREFOR

RELATED APPLICATION

This application claims priority to, and incorporates by reference in its entirety, U.S. provisional application No. 61/606,739 filed 5 Mar. 2012.

TECHNICAL FIELD

This invention relates to light emitting panel assemblies, and in particular light emitting panel assemblies with light guides. The light emitting panel assemblies may for example be a luminaire.

BACKGROUND

Light emitting panel assemblies use light guides to transmit light from point light sources such as light emitting diodes (LEDs) through a transition area to an emission area where the light is extracted. Light travels through the light guide by way of total internal reflection until it is extracted. In known light guides light is internally reflected through the guide in an uninterrupted linear path in the plane perpendicular to the normal of the flat sides of the light guide. In known light guides, when the light is extracted by extraction elements the light can appear to the viewer as undesirable visible lines of light emanating from the light sources. The visual definition of these lines can vary depending on the type of extraction elements used, the distance between the extraction elements and the light source(s), and the width or thickness of the light guide. Light emitting panel assemblies and light guides that reduce or eliminate these visible lines of light and emit light which is more visually homogenous across the emitting surface are desirable.

SUMMARY

According to one aspect of the invention, a light emitting panel assembly is provided. The assembly includes: a light source; a transition area including a first major side and a second major side, wherein at least one of the first major side and the second major side includes a plurality of vertically extending flutes, wherein the flutes extend at least a portion of the height of the transition area; and an emission area in optical communication with the transition area, the emission area including light extraction elements.

The first major side and the second major side may have flutes. The flutes may span substantially the height of the transition area. The flutes may have a horizontal cross-section pattern selected from the group consisting of sinusoidal, zig-zagged, rectangular, convex semicircular, and concave semicircular, and combinations thereof. The flutes may be adjacent each other or spaced apart.

The assembly may have a plurality of light sources. The flutes of the first major side and the flutes of the second major side may be configured in mirror image relation to each other or offset in relation to each other. The width of the flutes may be equal to or less than the pitch of the light sources.

The transition area may be a solid core and a first film comprising the flutes, the first film bonded to a first side of the core to define the first major side. The transition area may include a second film comprising the flutes, the second film bonded to a second side of the core to define the second major side. Or, the transition area may be a hollow core with vertically extending ribs or ridges disposed along interior surfaces of the first and second major surfaces.

The emission area has a first major side and a second major side, and at least one of the first major side and the second major side of the emission area may have a plurality of vertically extending flutes, wherein the flutes extend at least a portion of the height of the emission area. The flutes of the transition area may be continuous with the flutes of the emission area. In some embodiments, the flutes may be absent in the transition area and located only in the emission area.

The transition area may include a non-straight path between the light source and the emission area, whereby substantially all light from the light source internally reflects off at least one of the major sides of the transition area before entering the emission area. The non-straight path may include a curved portion and may be defined by an angle θ between a plane of a surface of the transition area that initially receives light from light source and a plane of an interface of the transition area and the emission area, wherein the angle θ is in the range of about 30 degrees to 90 degrees. The non-straight path may have an "S-curve".

A radius of an outer side of the curved portion is substantially equal to or greater than a critical radius of the outer side of the curved portion. The radius of the outer side of the curved portion may be greater than or equal to 1.0 cm.

The inner side and the outer side of the curved portion may be concentric or non-concentric. When non-concentric, the inner side of the curved portion may have a greater curvature than an inner side of the curved portion that would result in a concentric curved portion, or the inner side of the curved portion may begin at a point above a point where the outer side of the curved portion begins. The thickness of the curved portion may increase in a direction away from the light source.

The assembly may include at least two light sources and a Y-shaped transition area, wherein each of the two arms of the Y-shaped transition area includes a non-straight path between the light source and the emission area, whereby substantially all light from each light source internally reflects off of at least a fluted side of the transition area before entering the emission area. The non-straight path may include a curved portion and may be defined by an angle θ between a plane of a surface of the transition area that initially receives light from light source and a plane of an interface of the transition area and the emission area, wherein the angle θ is in the range of about 30 degrees to 90 degrees. The inner side and an outer side of each of the curved portions may be concentric or non-concentric. When non-concentric, the inner side of the curved portion may have a greater curvature than an inner side of the curved portion that would result in a concentric curved portion, or the inner side of the curved portion may begin at a point above a point where the outer side of the curved portion begins. A thickness of the curved portion may increase in a direction away from the light source. Individual light elements of a first one of the light sources may be in staggered configuration with individual light elements of the second one of the light sources.

The assembly may have a transition area having a "V-shaped" light receiving surface in optical communication with the light source. Each inner and outer side of the "V-shaped" light receiving surface may be convex.

The assembly may have flutes that are continuous or non-continuous in their vertical extent. Where the flutes are non-continuous, each flute may include at least two fluted segments and at least one non-fluted segment therebetween, wherein the non-fluted segment comprises a stepped thickening of the light guide. The light source of the assemblies may be an LED.

In another aspect, the invention relates to a luminaire that includes a light emitting panel assembly described herein.

BRIEF DESCRIPTION OF DRAWINGS

In drawings which show non-limiting embodiments of the invention:

FIGS. 2A to 2C are partial top schematic views of a light guide according to an embodiment of the invention;

FIGS. 7A and 7B are partial top and front schematic views respectively of a prior art light guide showing the paths of exemplary light rays from multiple light sources;

FIG. 18A to 18E are front, horizontal cross section (along plane A-A in 18A), side, and first detail (area D in 18A) and second detail (area E in 18A) views respectively of a light emitting panel assembly according to an embodiment of the invention;

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The term "horizontal" as used in this specification is a relative term that refers to an orientation generally perpendicular to the overall direction of light travelling through the light emitting panel assembly. The term "vertical" as used in this specification is a relative term that refers to an orientation generally parallel to the overall direction of light travelling through the light emitting panel assembly. The term "upper" and "above" as used in this specification refers to a position within the light emitting panel assembly relatively closer to the light source. The term "lower" and "below" as used in this specification refers to a position within the light emitting panel assembly relatively farther from the light source.

The light emitting panel assemblies of the invention are particularly advantageous for use as luminaires or as a component of luminaires, but as would be understood by persons of skill in the art may be used in other applications.

Figure 1A:
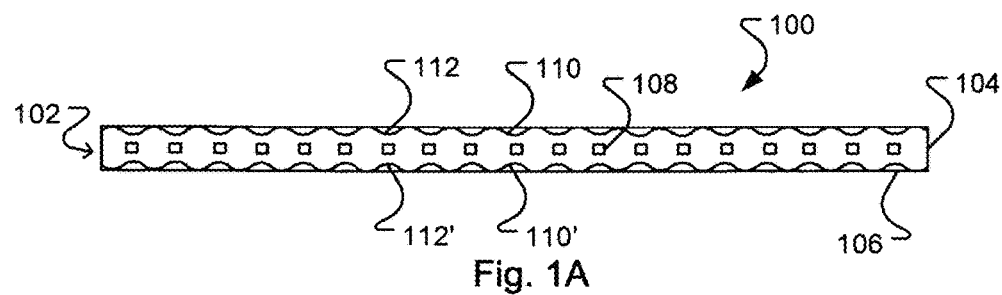
FIGS. 1A to 1C are top, front, and side views respectively of a light emitting panel assembly according to an embodiment of the invention.
Figure 1B:
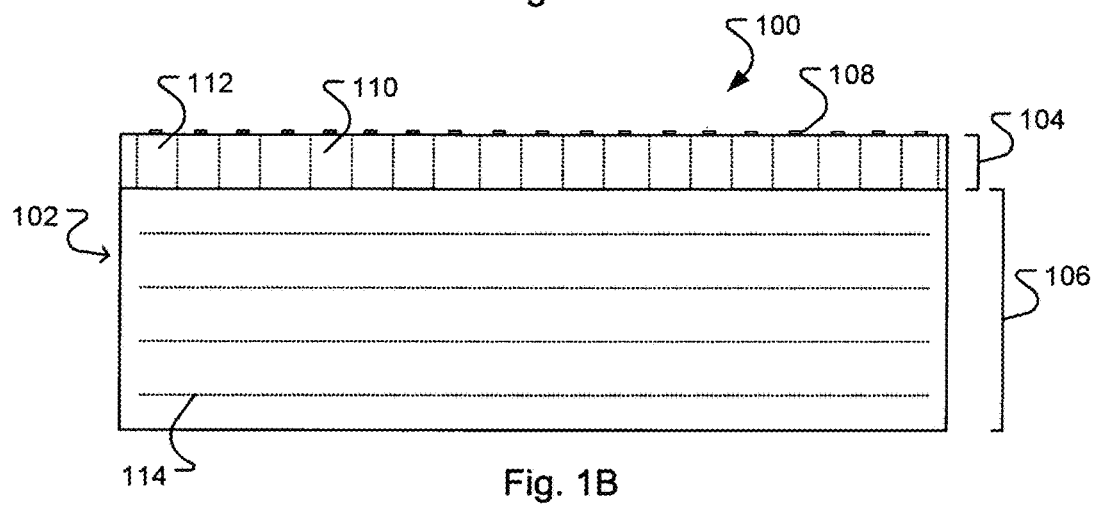
Figure 1C:
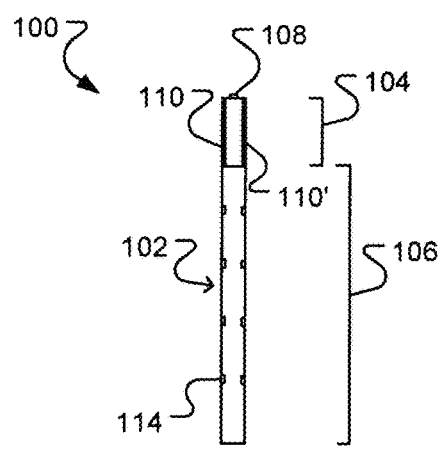

FIGS. 1A to 1C show a light emitting panel assembly 100 according to an embodiment of the invention. Light emitting panel assembly 100 includes a light guide 102. Light guide 102 is constructed of a solid core material with a high refractive index, such as polymethyl methacrylate (PMMA), polycarbonate (PC), or the like.

Light guide 102 includes a transition area 104 and an emission area 106. Transition area 104 is integrally formed and in optical communication with emission area 106. In other embodiments, transition area 104 may be coupled to and in optical communication with emission area 106, and these two areas made be constructed of the same or different material with similar refractive indices. In yet other embodiments, a bridging area (not shown) constructed of the same or different material with a similar refractive index may be provided between the transition area and emission area. Light travels within the transition area, bridging area, and at least part of the emission area, by way of total internal reflection. In the case of where the light emitting panel assembly is a luminaire, the bridging area may serve to provide spacing between the transition area and emission area to allow design or structural elements of the luminaire to obscure the transition area from view while ensuring that light from the emission area is not blocked by the same design or structural elements.

An array of light sources 108 is located adjacent an upper region of transition area 104. Light sources 108 are evenly spaced apart along the length of transition area 104. In some embodiments, the spaces between light sources 108 may be in the range of about 2.5 mm to 50 mm, or about 5.0 mm to 10 mm. In some embodiments, including in the embodiment illustrated in FIGS. 1A to 1C, light sources 108 are located at an upper surface of transition area 104 opposite a lower surface of transition area 104 joining emission area 106 to maximize horizontal diffusion of light prior to the light entering emission area 106. In other embodiments light sources 108 may be positioned in other locations adjacent to, within, or in otherwise optical communication with, transition area 104.

Light sources 108 are light emitting diodes (LEDs). In other embodiments, light sources 108 may be another suitable point source of light, such as a laser diode, a fibre optic transmitting light from a remote source, and the like.

Transition area 104 has opposing major sides 110, 110'. Major sides 110, 110' have corresponding parallel corrugations or flutes 112, 112' that vertically span transition area 104. The vertical orientation of the flutes provides total internal reflection of light along the vertical plane and prevents unintended extraction or loss of light. In some embodiments flutes 112, 112' may span only a portion of the height of transition area 104. Flutes 112, 112' are sinusoidal in horizontal cross-section, as can be seen in FIG. 1A.

Flutes 112, 112' cause horizontal diffusion of light from light sources 108 prior to the light entering emission area 104 and being extracted by extraction elements 114. Extraction elements 114, and other references to extraction elements herein, refer to any type of extraction element known to those skilled in the art. FIGS. 2A to 2C illustrate example embodiments of the invention showing the paths of exemplary light rays emitted from an LED light source as the light rays are reflected by flutes.

Figures 3A, 3B:
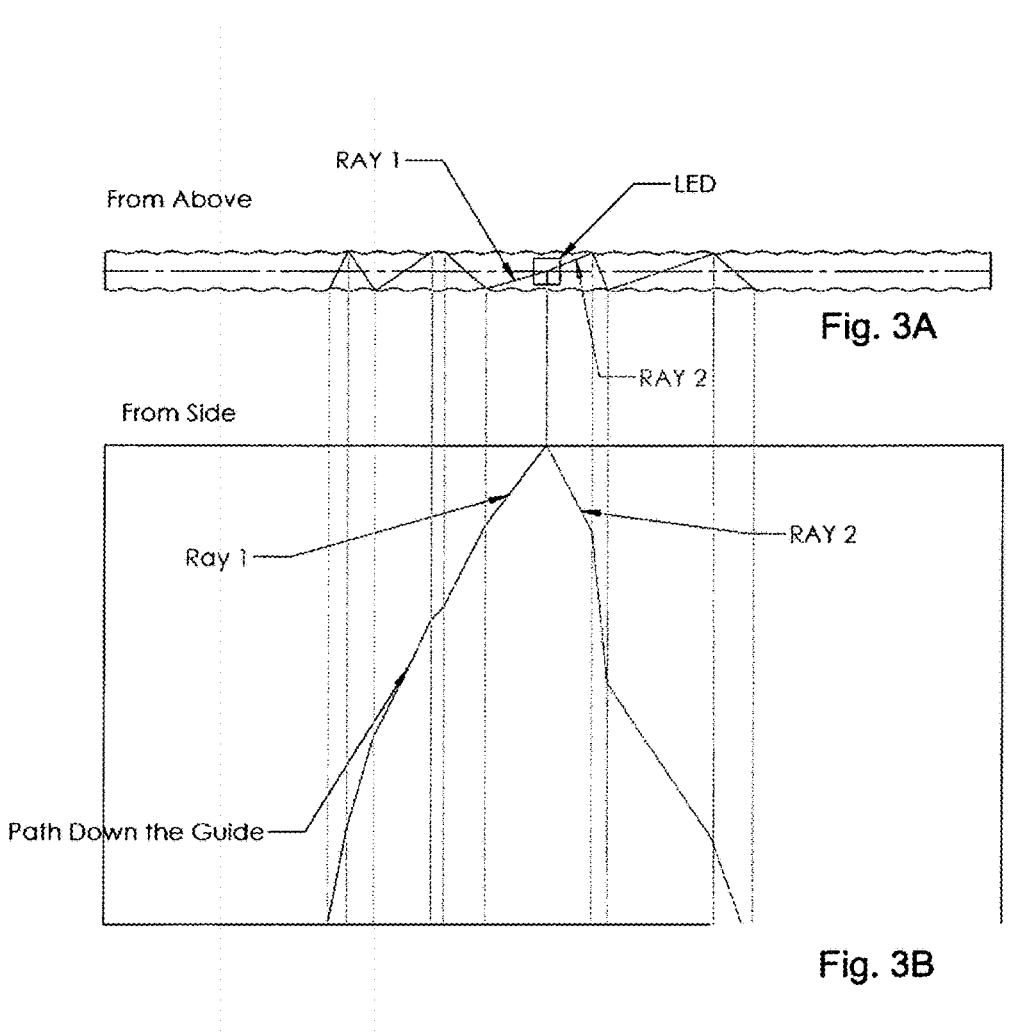
FIGS. 3A and 3B are partial top and front schematic views respectively of a light guide according to an embodiment of the invention showing the paths of exemplary light rays from a single light source.
Figure 4A:
FIGS. 4A and 4B are partial top and front schematic views respectively of a light guide according to an embodiment of the invention showing the paths of exemplary light rays from multiple light sources.
Figure 4B:
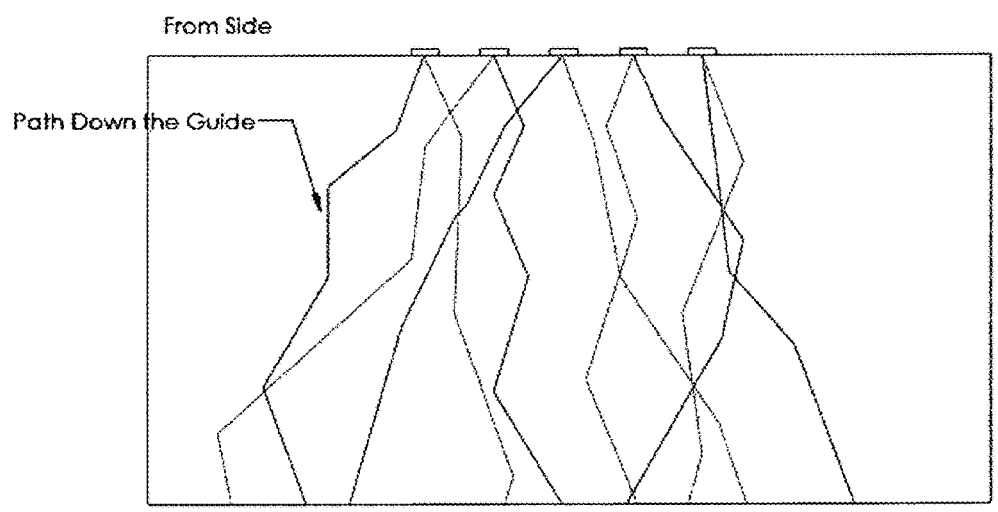
Figure 5A:
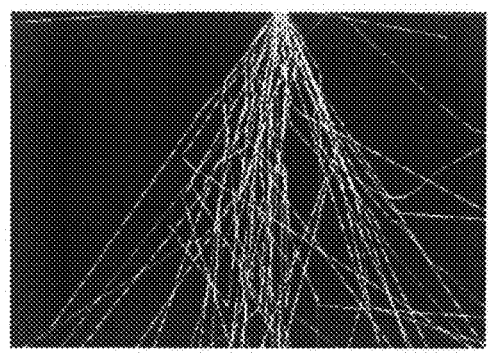
FIGS. 5A and 5B are exemplary simulated light ray traces produced by one light source and multiple light sources, respectively, of light emitting panel assemblies according to embodiments of the invention.
Figure 5B:
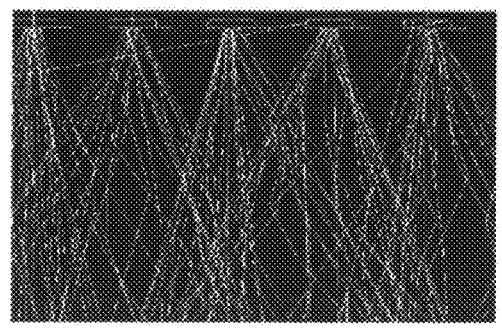
Figure 5C:
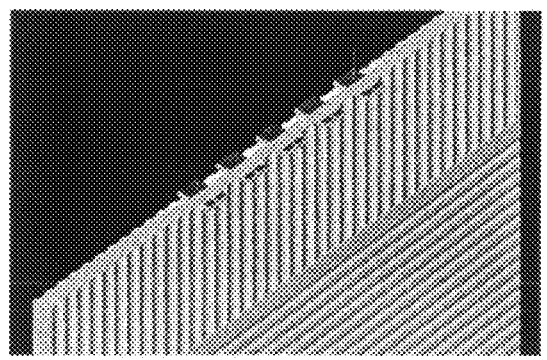
FIG. 5 C is a partial perspective schematic view of the light emitting panel assembly of FIG. 5B.
Figure 6A:
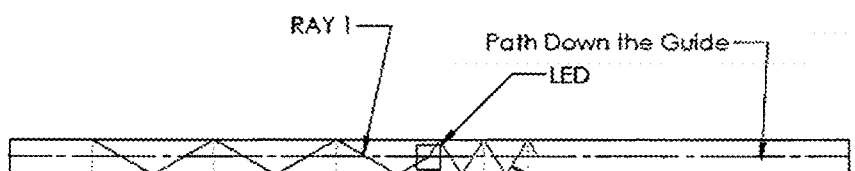
FIGS. 6A to 6C are partial top, front and side schematic views respectively of a prior art light guide showing the paths of exemplary light rays from a single light source (the vertical lines spanning FIGS. 6A and 6B, and the horizontal lines spanning FIGS. 6B and 6C, are for reference to corresponding points between the figures and do not represent any structure element of the light guide)
Figures 6B, 6C:
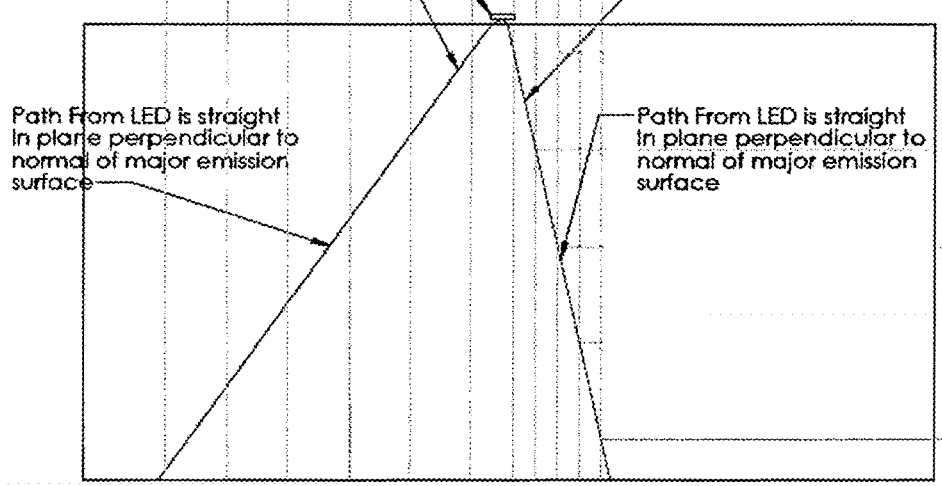

FIGS. 3A, 3B, 4A, and 4B on the one hand, and FIGS. 6A, 6B, 6C, 7A and 7B on the other hand illustrate by way of example the difference between the paths of exemplary light rays from one or more LED light sources in a transition area according to example embodiments of the invention (FIGS. 3A, 3B, 4A, and 4B) and light rays from an LED light source in a transition area of a conventional light guide (FIGS. 6A, 6B, 6C, 7A and 7B). As shown in FIGS. 6B and 7B, light rays in a transition area of a conventional light guide travel in uninterrupted linear paths due to the successive constant angles at which individual light rays are incident on the flat major sides of the transition area (as shown in FIGS. 6A and 7A). The resulting extracted light appears as undesirable visible bands or lines of light emanating from the light sources. In contrast, as shown in FIGS. 3B and 4B, the paths of light rays in the transition area of light guides according to example embodiments of the invention bend at various angles due to the successive various angles at which the light rays are incident on the flutes (as shown in FIGS. 3A and 4A). The resulting horizontal diffusion of light rays provides extracted light wherein visible lines of light are minimized or reduced, providing light which is more visually homogenous across the emitting surface. Examples of this horizontal diffusion effect are shown in FIGS. 5A and 5B which show optically simulated light ray traces in light emitting panel assemblies according to example embodiments of the invention. FIG. 5C shows the light sources, transition area, and emission area of the light emitting panel assembly from which the light ray traces of FIG. 5B were derived.

Figure 8:
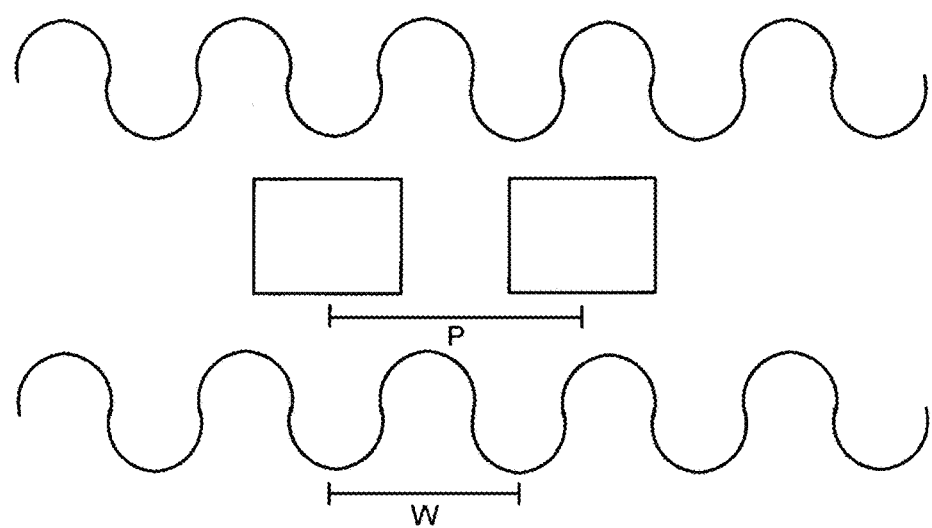
FIG. 8 is a partial top schematic view of a light emitting panel assembly according to an embodiment of the invention.
Figure 9:
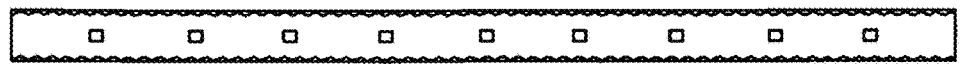
FIG. 9 is a top view of a light emitting panel assembly according to an embodiment of the invention.
Figure 10:
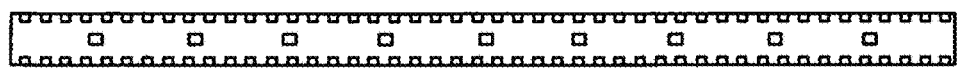
FIG. 10 is a top view of a light emitting panel assembly according to an embodiment of the invention.
Figure 11:
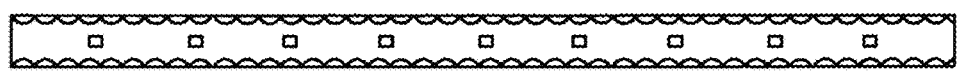
FIG. 11 is a top view of a light emitting panel assembly according to an embodiment of the invention.
Figure 12:
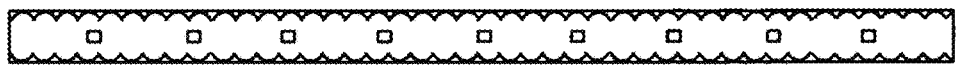
FIG. 12 is a top view of a light emitting panel assembly according to an embodiment of the invention.
Figure 13:
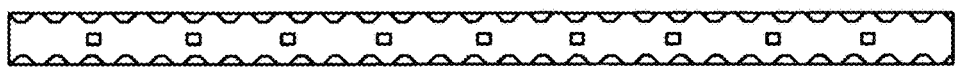
FIG. 13 is a top view of a light emitting panel assembly according to an embodiment of the invention.

The length and width of each flute, and the spacing if any between adjacent flutes, can vary depending on the application. As shown in FIG. 8, in some example embodiments the width W of each individual flute is less than or equal to the pitch P (center to center distance) of the light sources. In other embodiments, width W may be greater than pitch P.

Other embodiments may have flutes with other horizontal cross-sectional shapes; exemplary shapes of flutes are shown in the embodiments illustrated in FIGS. 9 to 13 (shown without the light sources) wherein the flutes are zig-zag/triangular, rectangular, concave semicircular, convex semicircular, and polygonal, in horizontal cross-section, respectively. Other embodiments may have a combination of flutes of one or more of the foregoing shapes and/or any other shapes and patterns that cause variation in the successive angles at which individual light rays are incident on the major sides of the transition area.

Figure 14:
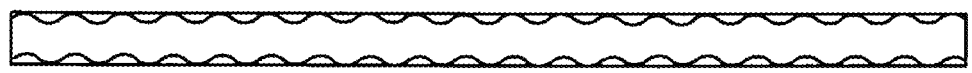
FIG. 14 is a top view of a light emitting panel assembly according to an embodiment of the invention.
Figure 15:
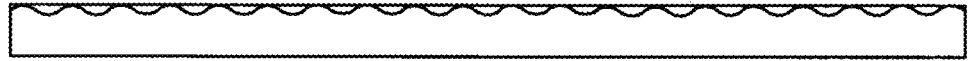
FIG. 15 is a top view of a light emitting panel assembly according to an embodiment of the invention.
Figure 16:
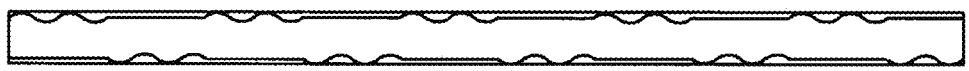
FIG. 16 is a top view of a light emitting panel assembly according to an embodiment of the invention.

In the embodiments shown in FIGS. 1 to 4 and 9 to 13, the flutes are aligned in a mirror image manner with each other. Other embodiments may have flutes which are offset from each other, for example by 25% or 50%. FIG. 14 shows an embodiment similar to the embodiment shown in FIGS. 1A to 1C except that the flutes are offset by 50%. Other embodiments may have flutes disposed only along one of the major sides, as in the example embodiment shown in FIG. 15. Still other embodiments may have flutes that are spaced apart and offset, as in the example embodiment shown in FIG. 16.

The dimensions of the flutes shown in FIGS. 1 to 4 and 9 to 16 are on a macro scale, on the order of millimeters or centimeters. In other embodiments, the dimensions of the flutes may be on a micro scale, on the order of micrometers or nanometers; in some embodiments the shapes and patterns of these micro scale flutes may, for example, be analogous to the shapes and patterns of the macro scale flutes described herein.

In some embodiments, instead of a solid transition area with fluted major sides, the light transition area may have a hollow core, with horizontal diffusion of light achieved by vertically extending reflective ribs, ridges or the like disposed on the interior of the major sides of the transition area.

In some embodiments, the major sides of the emission area may also have vertical flutes, as shown in the example embodiments in FIGS. 17A to 17C and 18A to 18E.

Figure 17A:
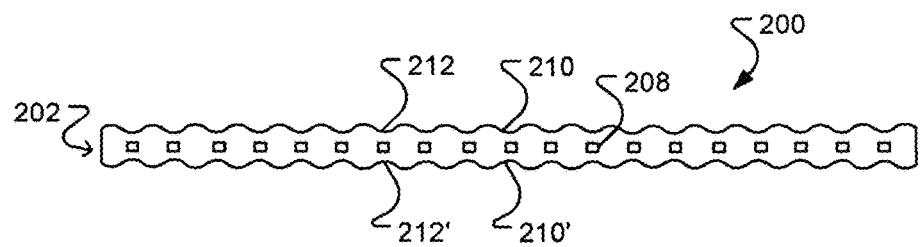
FIGS. 17A to 17C are top, front, and side views respectively of a light emitting panel assembly according to an embodiment of the invention.
Figure 17B:
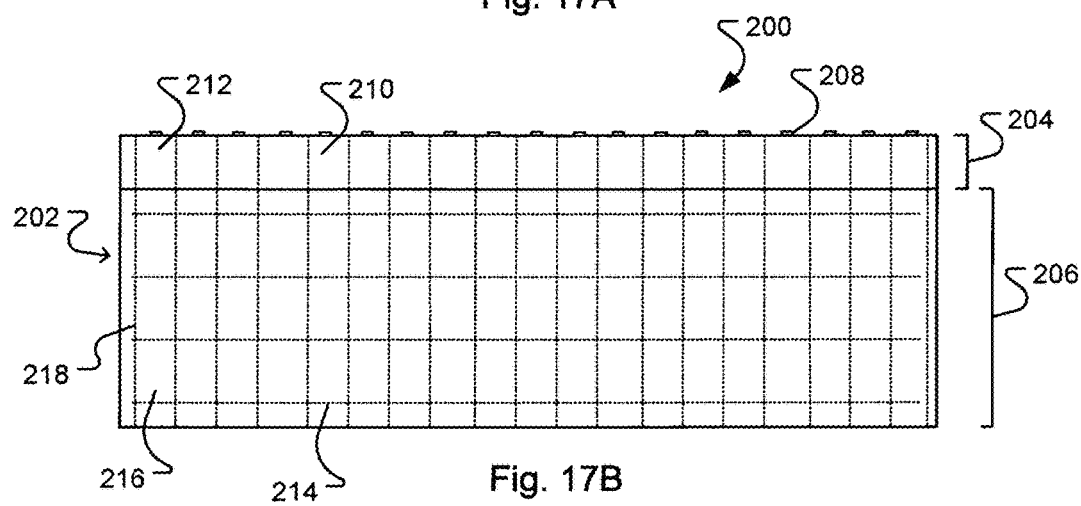
Figure 17C:
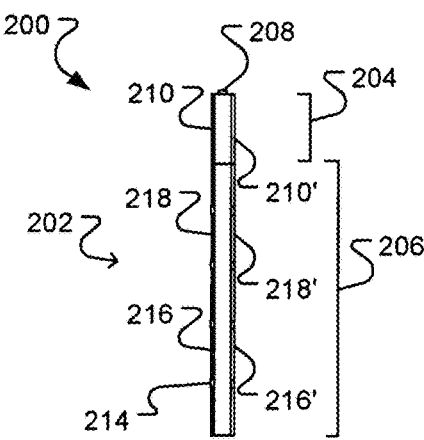
Figure 18A:
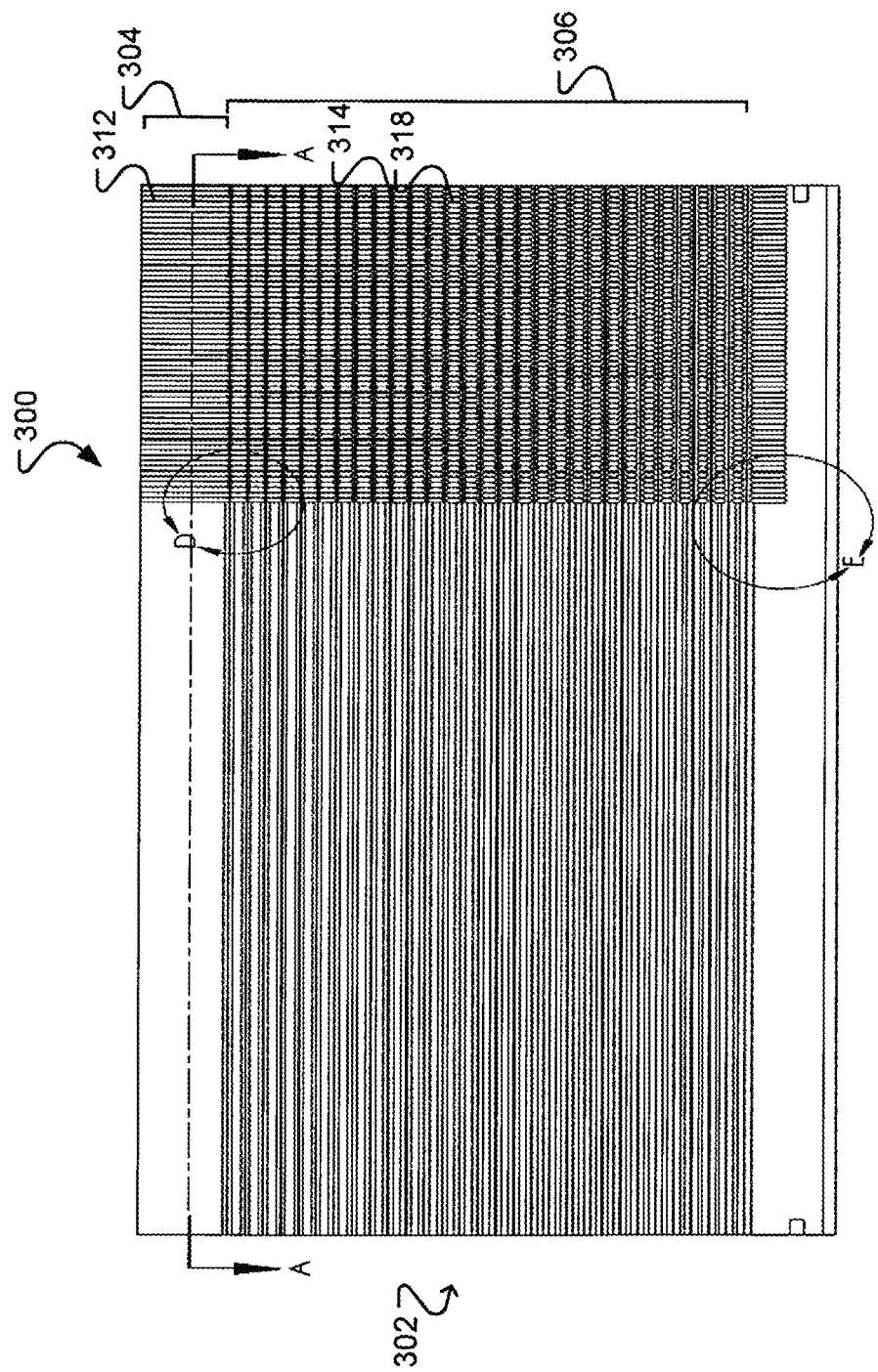

As shown in FIGS. 17A to 17C, light emitting panel assembly 200 includes a light guide 202, transition area 204, emission area 206, light sources 208, transition area major sides 210, 210', transition area flutes 212, 212', and extraction elements 214, which correspond in function and structure to equivalent structures of light emitting panel assembly 100 described above. Light emitting panel assembly 200 also includes emission area major sides 216, 216' and emission area vertical flutes 218, 218'. Emission area major sides 216, 216' and emission area vertical flutes 218, 218' flutes may be continuous with transition area major sides 210, 210' and transition area flutes 212, 212' for further horizontal diffusion of light rays internally reflecting down the light guide before extraction at extraction elements 214.

FIGS. 18A to 18E show a light emitting panel assembly 300 similar to light emitting panel assembly 200 including a light guide 302, transition area 304, emission area 306, light sources (not shown), transition area major sides 310, 310', transition area flutes 312, 312', extraction elements 314, emission area major sides 316, 316' and emission area vertical flutes 318, 318', all of which correspond in function and structure to equivalent structures of light emitting panel assembly 200 described above. In this embodiment, extraction elements 314 are disposed on one major side (major side 316) of light emitting panel assembly 300. In other embodiments, extraction elements may be disposed on both major sides. Also in this embodiment, extraction elements 314 increase in density, size and/or depth in the direction away from the light sources to compensate for the decreasing amount of light remaining in light guide 302.

Figure 19:
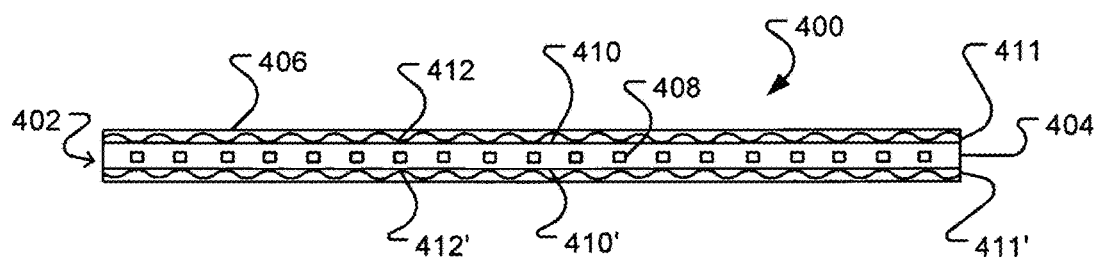
FIG. 19 is a top view of a light emitting panel assembly according to an embodiment of the invention.

In some embodiments, instead of a transition area where the flutes are formed as part of the solid core, the transition area may comprise one or more films, on which flutes are provided, bonded to a core with flat sides. As shown in FIG. 19, light emitting panel assembly 400 includes a light guide 402, transition area 404, emission area 406, and light sources 408. Transition area 404 includes films 411, 411' with flutes 412, 412' which are bonded onto the flat major sides of the core of transition area 404. Films 411, 411' may have a similar refractive index as the core and may for example be constructed of polyethylene terephthalate (PET), polymethyl methacrylate (PMMA), polycarbonate (PC), or the like. The film may be bonded to the core by any known optical adhesive such as UV curing optical adhesives and the like.

Figure 20A:
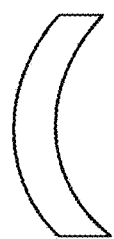
FIGS. 20A to 20D are top views of light guides according to various embodiments of the invention.
Figure 20B:
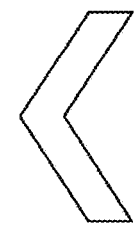
Figure 20C:
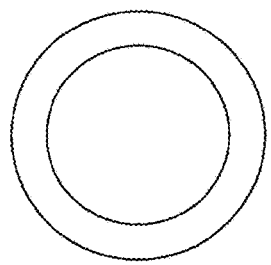
Figure 20D:
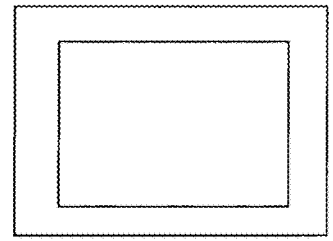

In some embodiments, instead of a linear horizontal cross-section, the light emitting panel assemblies may have a non-linear horizontal cross-section. According to some embodiments, the horizontal cross-section of the light emitting panel may be curved or bent, for example as illustrated in FIGS. 20A and 20B respectively. According to other embodiments, the horizontal cross-section of the light emitting panel may be any closed shape such as a circle or a polygon, for example as illustrated in FIGS. 20C and 20D respectively.

Figure 21:
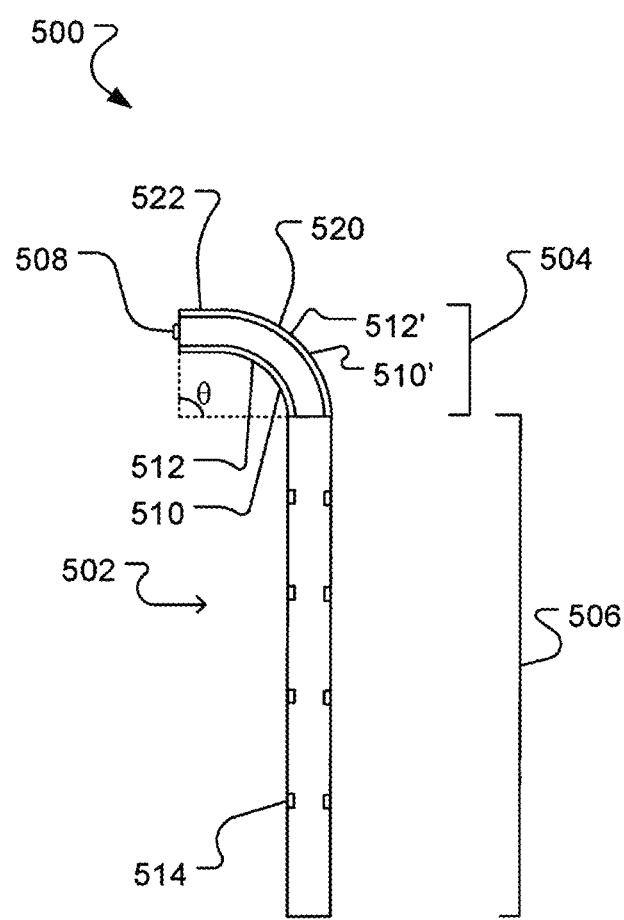
FIG. 21 is a side view of a light emitting panel assembly according to an embodiment of the invention.

FIG. 21 shows a light emitting panel assembly 500 according to another embodiment of the invention. Light emitting panel assembly 500 includes a light guide 502, transition area 504, emission area 506, light source 508, and opposing major sides 510, 510' with corresponding corrugations or flutes 512, 512'. The features of light emitting panel assembly 500 correspond in function and structure to equivalent structures of light emitting panel assembly 100 described above except that transition area 504 comprises a curved portion 520 and linear portion 522.

Figure 22:
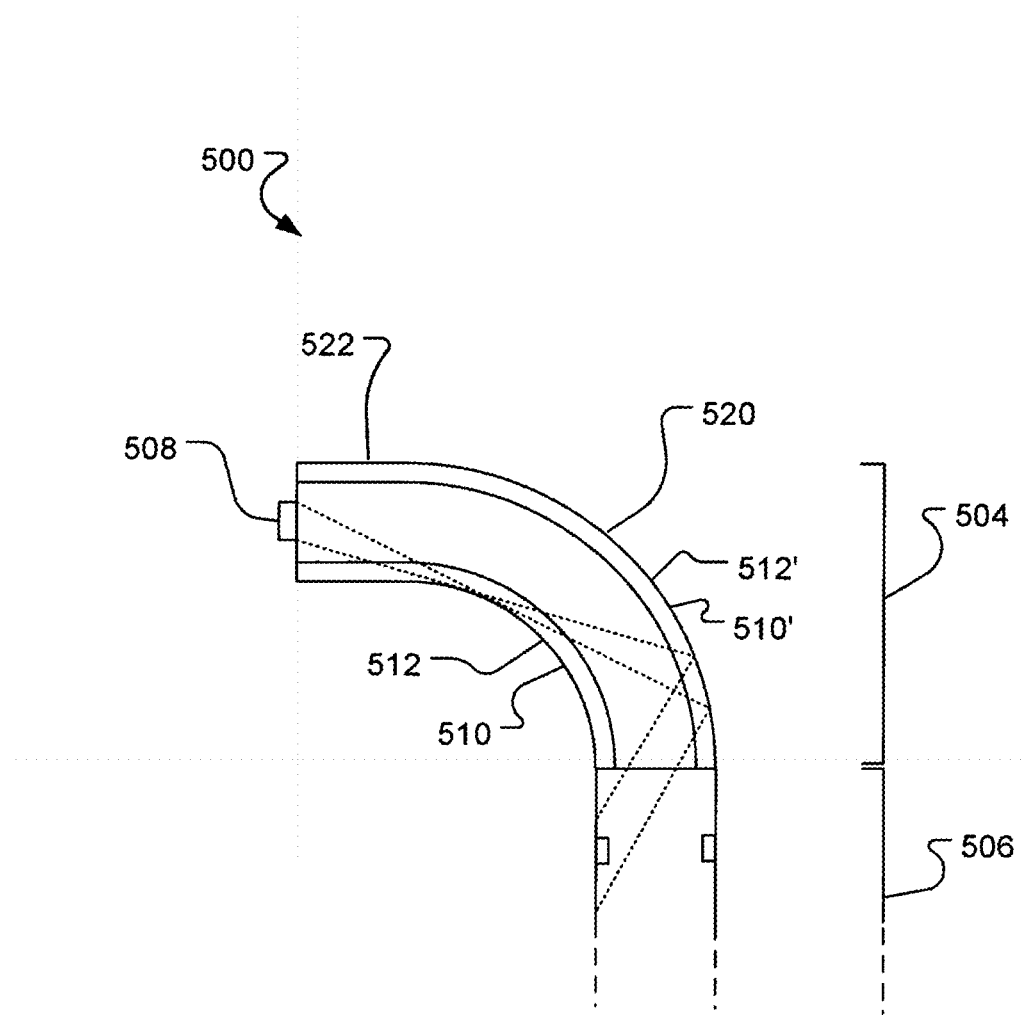
FIG. 22 is a partial side view of the light emitting panel assembly shown in FIG. 21.

Whereas in light emitting panel assembly 100 the path from light source 108 to the interface of transition area 104 and emission area 106 is straight, in light emitting panel assembly 500 curved portion 520 and linear portion 522 define a non-straight path between light source 508 and the interface of transition area 504 and emission area 506. The inventors have determined that this non-straight path further enhances horizontal diffusion of light in transition area 504. In some embodiments, as best shown in FIG. 22, curved portion 520 and linear portion 522 are configured to ensure that substantially all light rays (exemplified by the stippled lines) from light source 508 reflect off of at least one of opposing, fluted, major sides 510, 510' before entering emission area 506. In other words, the non-straight path prevents any light from light source 508 from directly entering emission area 506 without first being horizontally diffused by total internal reflection off of the fluted sides of transition area 504. The curved portion 520 thereby further minimizes undesirable visible bands or lines of light emanating from emission area 506. In some embodiments, the non-straight path may be an "S"-curve.

In some embodiments, as shown for example in FIG. 21, the non-straight path may in part be defined by an angle θ between the plane of the surface of transition area 504 that initially receives light from light source 508 and the plane of the interface of transition area 504 and emission area 506. In light emitting panel assembly 500 angle θ is approximately 90 degrees. In other embodiments, angle θ may be 30 to 90 degrees, or 60 to 90 degrees, or 75 to 90 degrees. In other embodiments, the angle θ may be greater than 90 degrees, or greater than 180 degrees as illustrated for example in FIG. 28.

Curved portion 520 forms a substantially smooth curve. In some embodiments, the curved portion may be defined by two joined linear sections. In other embodiments, the curved portion may be defined by more than two joined linear sections. Curved portion 520 and linear portion 522 together form transition area 504. In other embodiments, an additional linear portion may be formed between curved portion 520 and emission area 506. In other embodiments, linear portions may be absent and the curved portion may form substantially all of transition area 504.

Linear portion 522 provides distance between light source 508 and curved portion 520 to allow light from light source 508 to spread sufficiently before reflecting off of the fluted sides of transition area 504. In some embodiments, the length of linear portion 522 is dependent on the spacing between the individual sources 508 and the length/radii of curved portion 520. The larger the length/radii of curved portion 520 the shorter linear portion 522 needs to be as light traveling through transition area 504 will experience multiple reflections off of flutes 512, 512' which will disperse and horizontally diffuse the light. Moreover, closer spacing between individual light sources 508 also allows curved portion 520 to be shortened as less horizontal diffusion would be required in this situation. Consequently, increasing the radius/length of curved portion 520 and/or shortening the spacing between individual light sources 508 will allow linear portion 522 to be shorter and in some embodiments be absent altogether.

Figure 23:
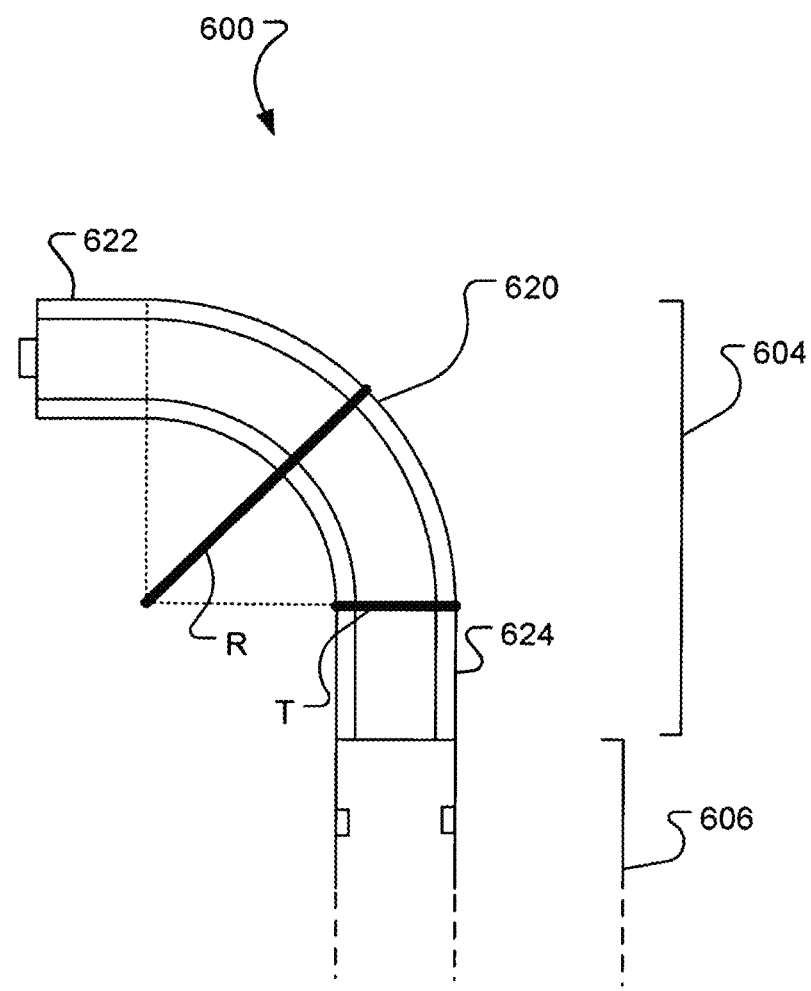
FIG. 23 is a partial side view of a light emitting panel assembly according to an embodiment of the invention.
Figure 24A:
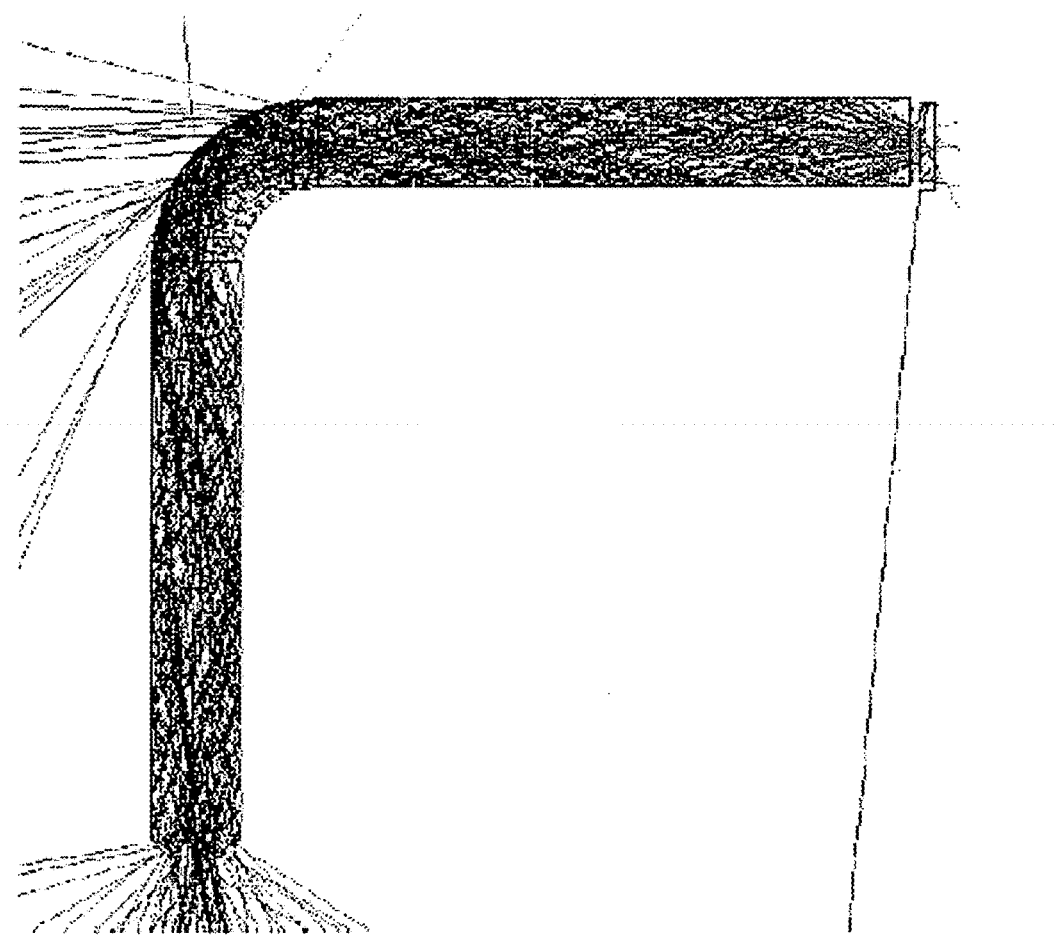
FIG. 24A to 24 D are side views of simulated light ray traces within a light emitting panel assemblies according to various embodiments of the invention.
Figure 24B:
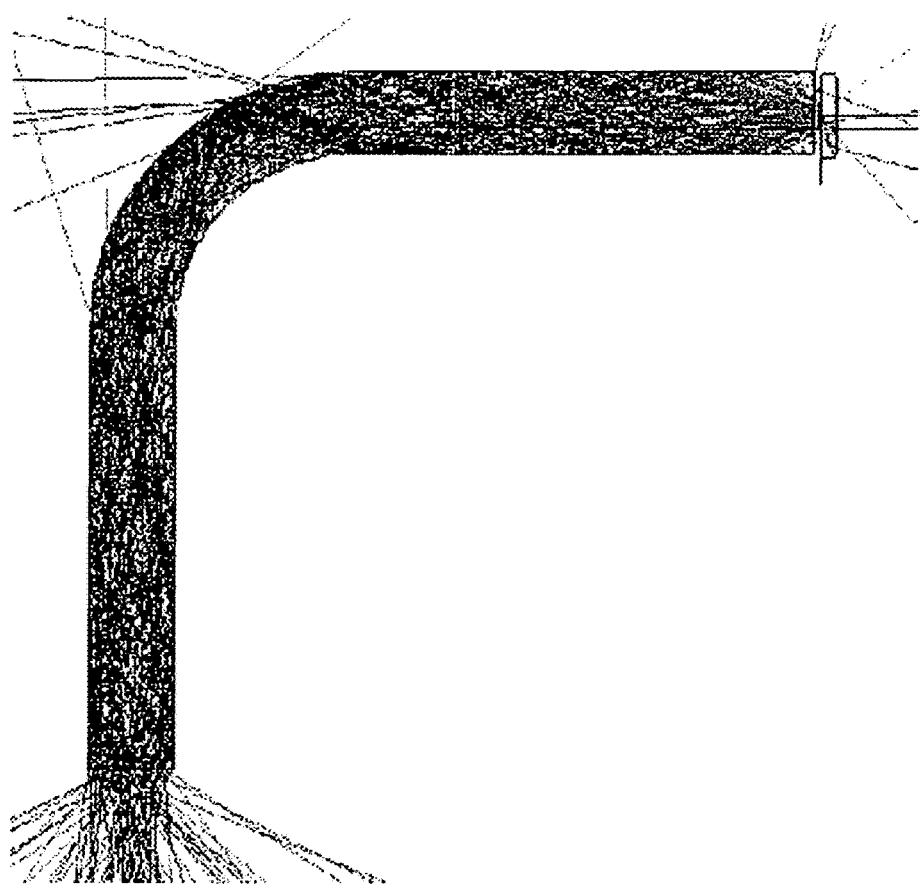
Figure 24C:
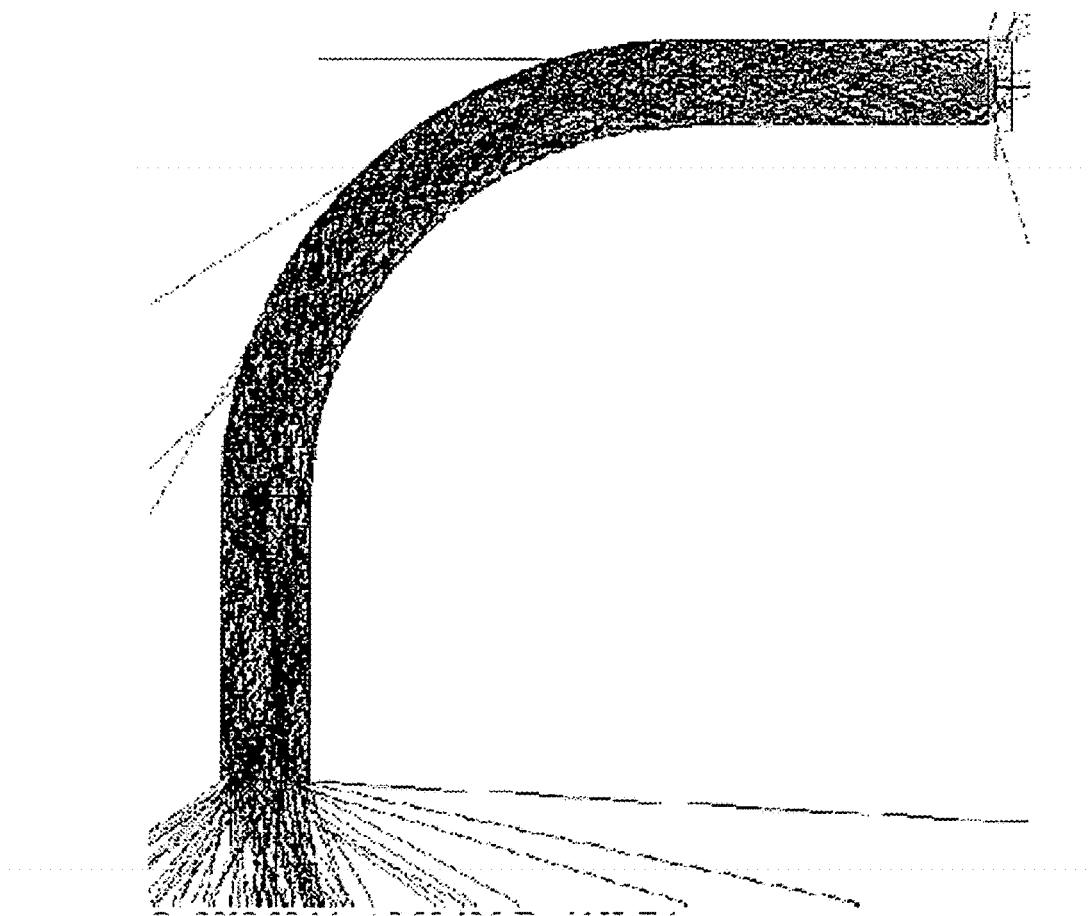
Figure 24D:
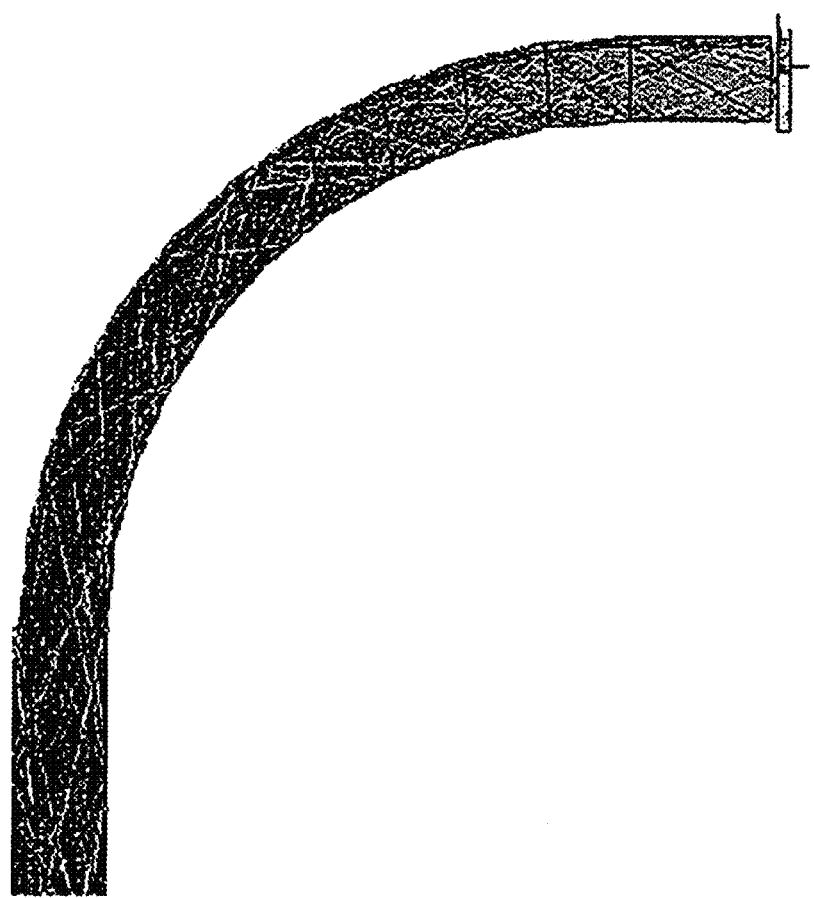

FIG. 23 shows a light emitting panel assembly 600 according to another embodiment of the invention. Light emitting panel assembly 600 is similar to light emitting panel assembly 500 except transition area 604 additionally includes a linear portion 624 between curved portion 620 and emission area 606. In other embodiments linear portion 622 and/or linear portion 624 may be absent.

The radius of the curved portion of the transition area, for example defined by radius R at the outer side of curved portion 620, may be substantially equal to or greater than the critical radius, i.e., the radius necessary to meet the critical angle requirement to maintain total internal reflection at the curved portion. In some embodiments, the thickness T of the curved portion ranges from 1.0 mm to 10 mm, or 2.0 mm to 8.0 mm, and radius R at the outer side of the curved portion is greater than or equal to 1.0 cm, greater than or equal to 2.0 cm, greater than or equal to 4.0 cm, greater than or equal to 6.0 cm, or greater than or equal to 10 cm. FIGS. 24A to 24D illustrate embodiments of the invention with progressively larger radii of the curved portion, showing a progressive reduction in the amount of light lost at the curved portion.

Figure 25:
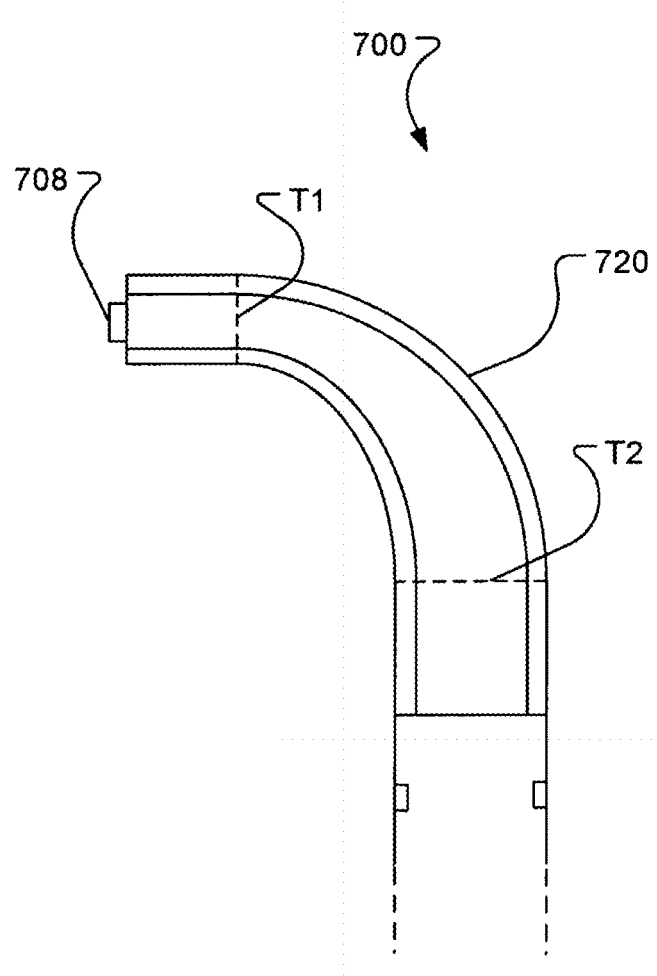
FIG. 25 is a partial side view of a light emitting panel assembly according to an embodiment of the invention.

FIG. 25 shows a light emitting panel assembly 700 according to another embodiment of the invention. Light emitting panel assembly 700 is similar to light emitting panel assembly 600 except that curved portion 720 is non-concentric due to the inner side of the curved portion having a greater curvature than an inner side of a concentric curved portion. As a result, the thickness of the curved portion gradually increases further from light source 708, i.e., thickness T1 at the beginning of curved portion 720 is less than the thickness T2 at the end of curved portion 720.

Figure 26:
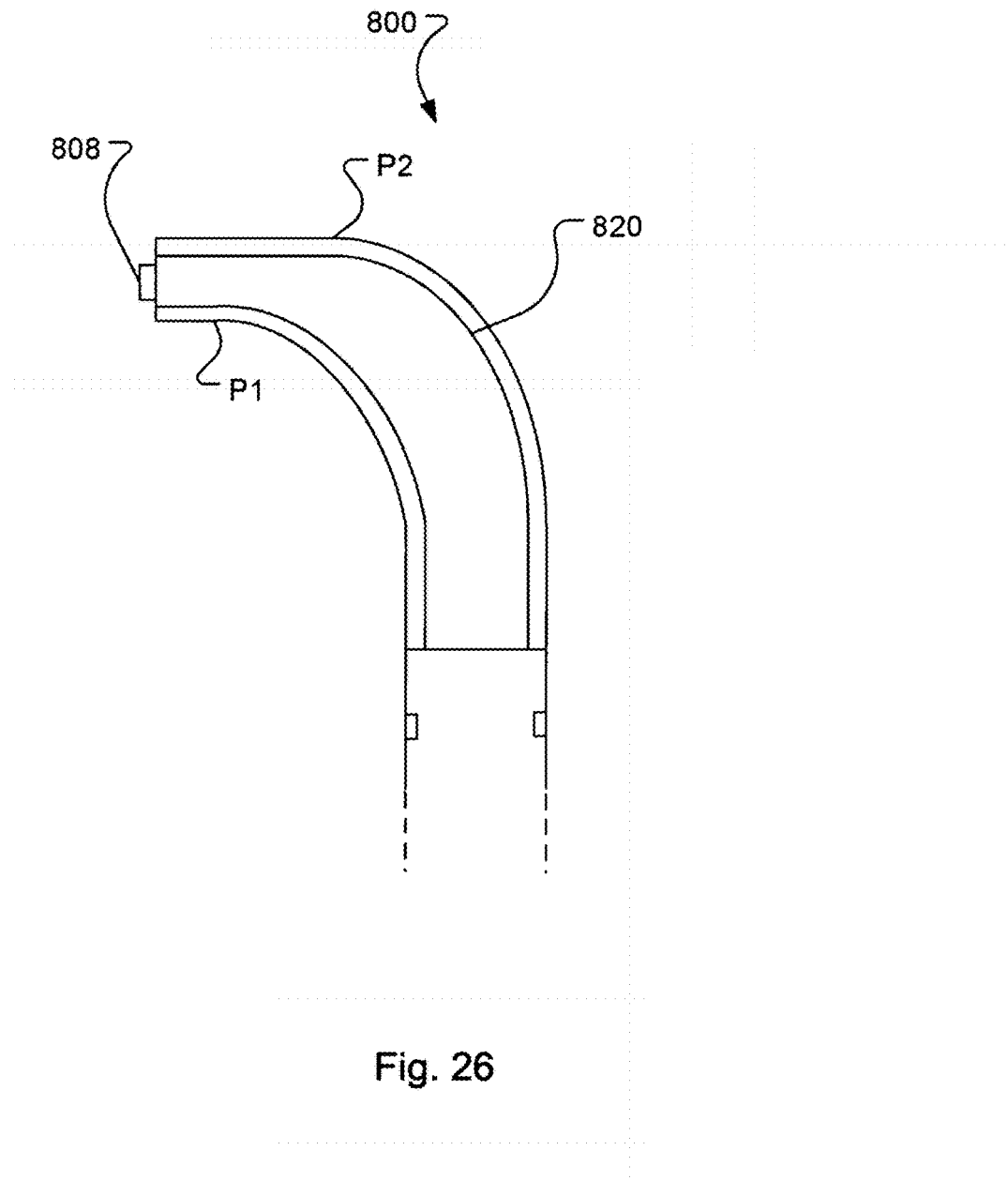
FIG. 26 is a partial side view of a light emitting panel assembly according to an embodiment of the invention.

FIG. 26 shows a light emitting panel assembly 800 according to another embodiment of the invention. Light emitting panel assembly 800 is similar to light emitting panel assembly 700 except that non-concentricity of curved portion 820 is due to the inner side of curved portion 820 beginning at a point P1 before the beginning point P2 of the outer side of curved portion 820. Similar to light emitting panel assembly 700, the thickness of curved portion 820 gradually increases away from light source 808.

Figure 27:
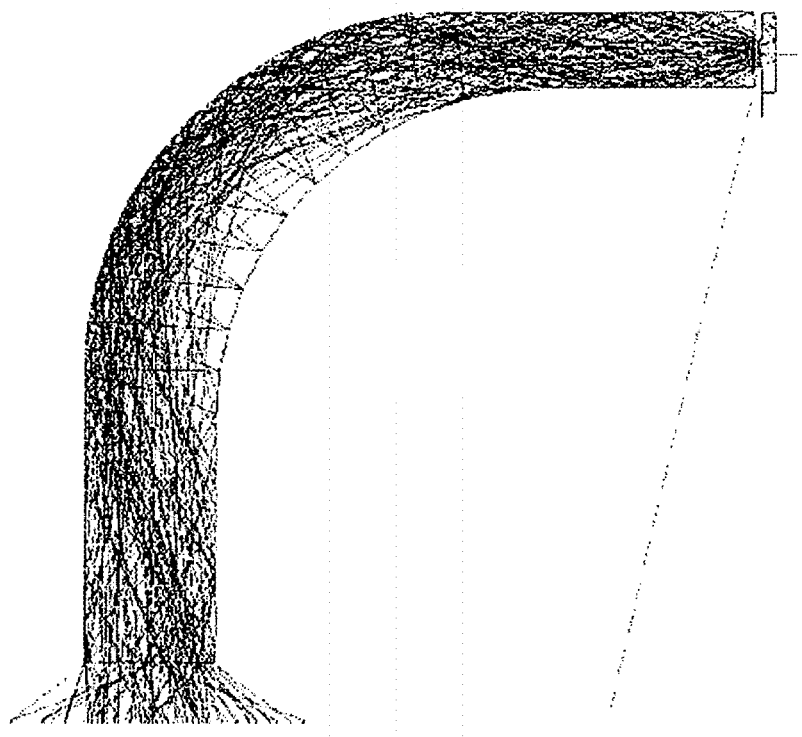
FIG. 27 is a side view of simulated light ray traces within a light emitting panel assembly according to an embodiment of the invention.

FIG. 27 illustrates simulated light ray traces of an embodiment of the invention with a curved portion with increasing thickness, similar to assemblies 700 and 800, showing little or no light lost at the curved portion.

Figure 28:
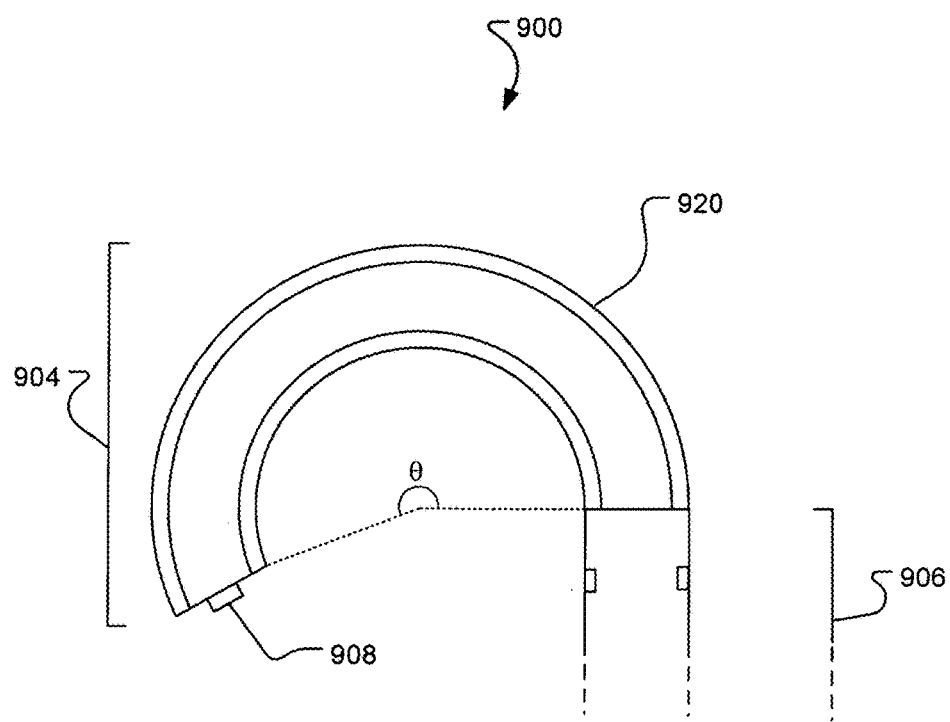
FIG. 28 is a partial side view of a light emitting panel assembly according to an embodiment of the invention.

FIG. 28 shows a light emitting panel assembly 900 according to another embodiment of the invention. Light emitting panel assembly 900 is similar to light emitting panel assembly 500 except that instead of a linear portion 522, curved portion 920 extends the entire length of transition area 904 and angle θ is greater than 180 degrees. In other embodiments transition area 904 includes (a) linear portion(s) before and/or after curved portion 920. In some embodiments, similar to the curved portions of light emitting panel assemblies 700 and 800, the inner and outer sides of curved portion 920 may be non-concentric, with increasing thickness of curved portion 920 away from light source 908 and toward emission area 906.

Figure 29:
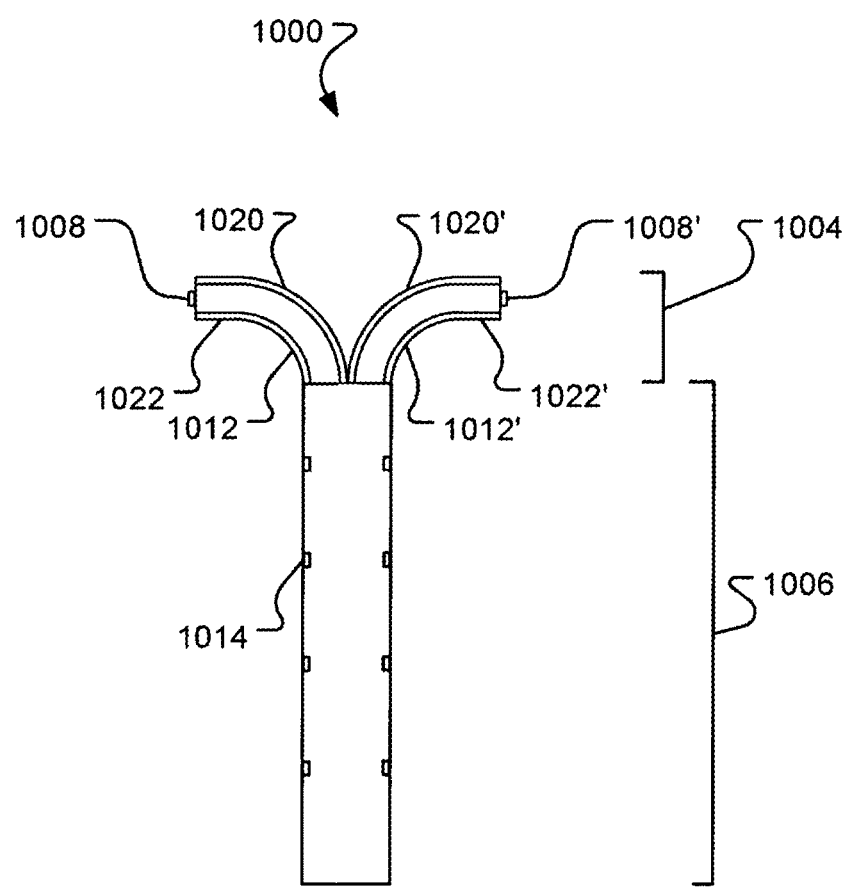
FIG. 29 is a side view of a light emitting panel assembly according to an embodiment of the invention.
Figure 30:
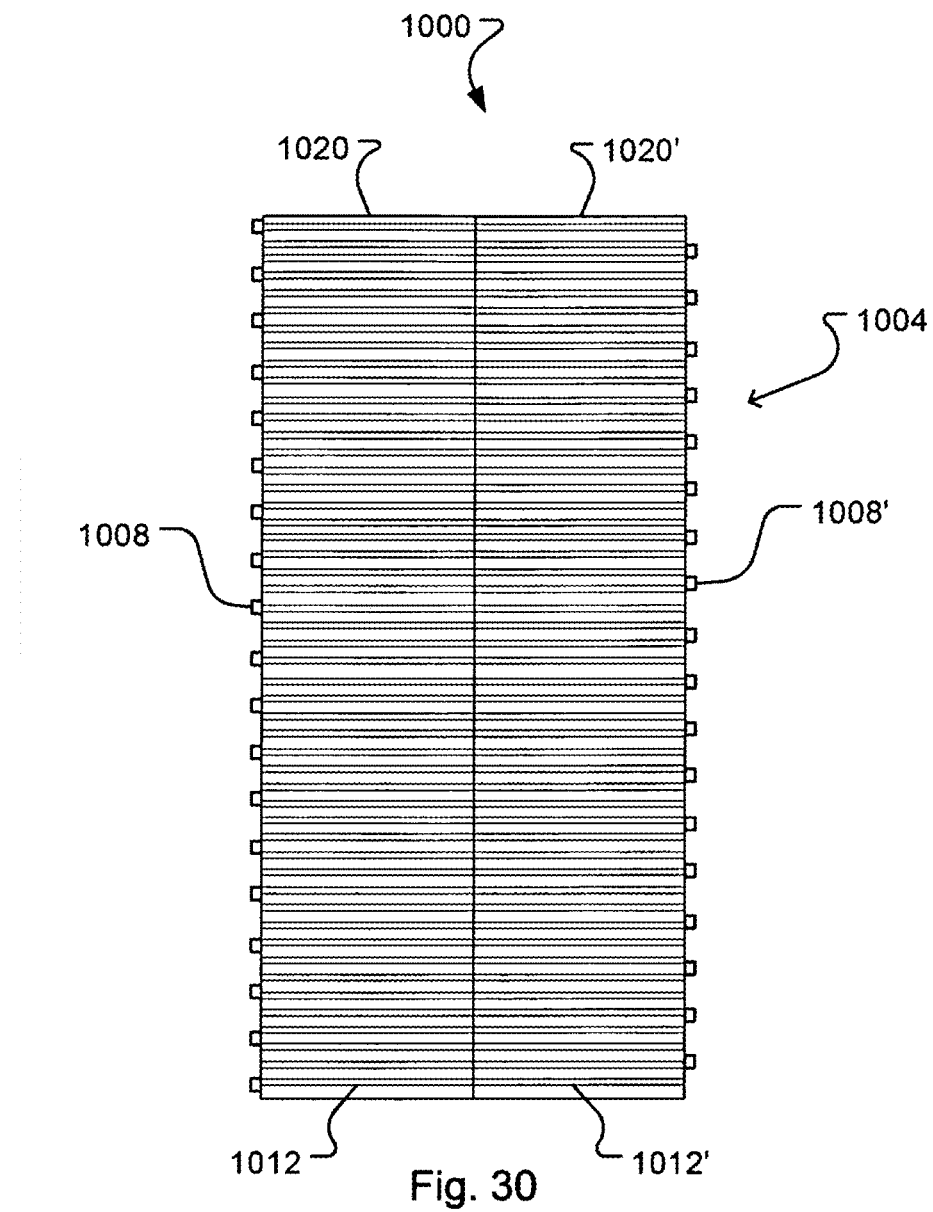
FIG. 30 is a top view of a light emitting panel assembly according to the embodiment of the invention shown in FIG. 29.
Figure 31:
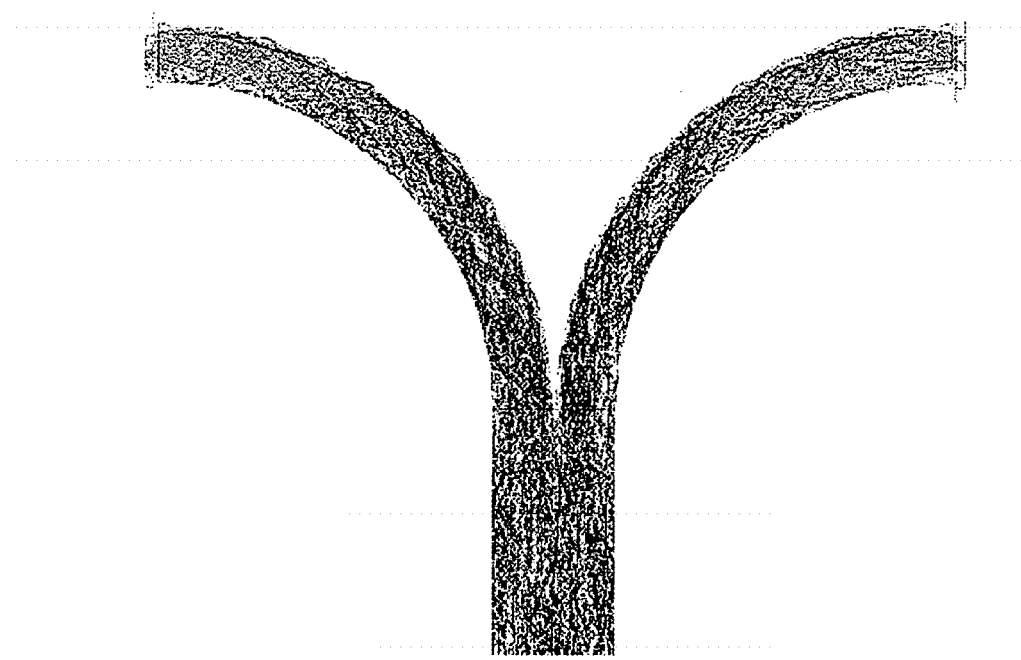
FIG. 31 is a partial side view of simulated light ray traces within a light emitting panel assembly according to an embodiment of the invention.

FIG. 29 shows a light emitting panel assembly 1000 according to another embodiment of the invention. Light emitting panel assembly 1000 is similar to light emitting panel assembly 500 except it has a transition area 1004 that combines two mirror image curved portions 1020, 1020', in a Y-shaped configuration, with corresponding light sources 1008, 1008'. Light emitting panel assembly 1000 includes flutes 1012 on major sides 1020,1022, and flutes 1012' on major sides 1020',1022'. Light dispersed in transition area 1004 is directed to a unitary emission area 1006 where light is emitted from extraction elements 1014. FIG. 30 is a top view of light emitting panel assembly 1000, showing how individual light elements of corresponding light sources 1008, 1008' are staggered to enhance the visual uniformity of light emitted from light emitting panel assembly 1000. In some embodiments individual light elements of corresponding light sources 1008, 1008' may be aligned instead of staggered. FIG. 31 shows optically simulated light ray traces in a light emitting panel assembly according to example embodiments of the invention similar to light emitting panel assembly 1000.

In some embodiments emission area 1006 may, at least in part, be formed from two panels instead of a unitary panel. In some embodiments, similar to the curved portions of light emitting panel assemblies 700 and 800, the inner and outer sides of curved portions 1020 and 1020' may be non-concentric, with increasing thickness of the curved portions in the direction away from light source 1008. In some embodiments, linear portions 1022, 1022' may be absent and/or located both above and below curved portions 1020, 1020'. In some embodiments flutes 1012,1012' may extend beyond transition area 1004 into emission area 1006. The regions of emission area 1006 with flutes 1012,1012' extending thereto may or may not also have extraction elements.

Figure 32:
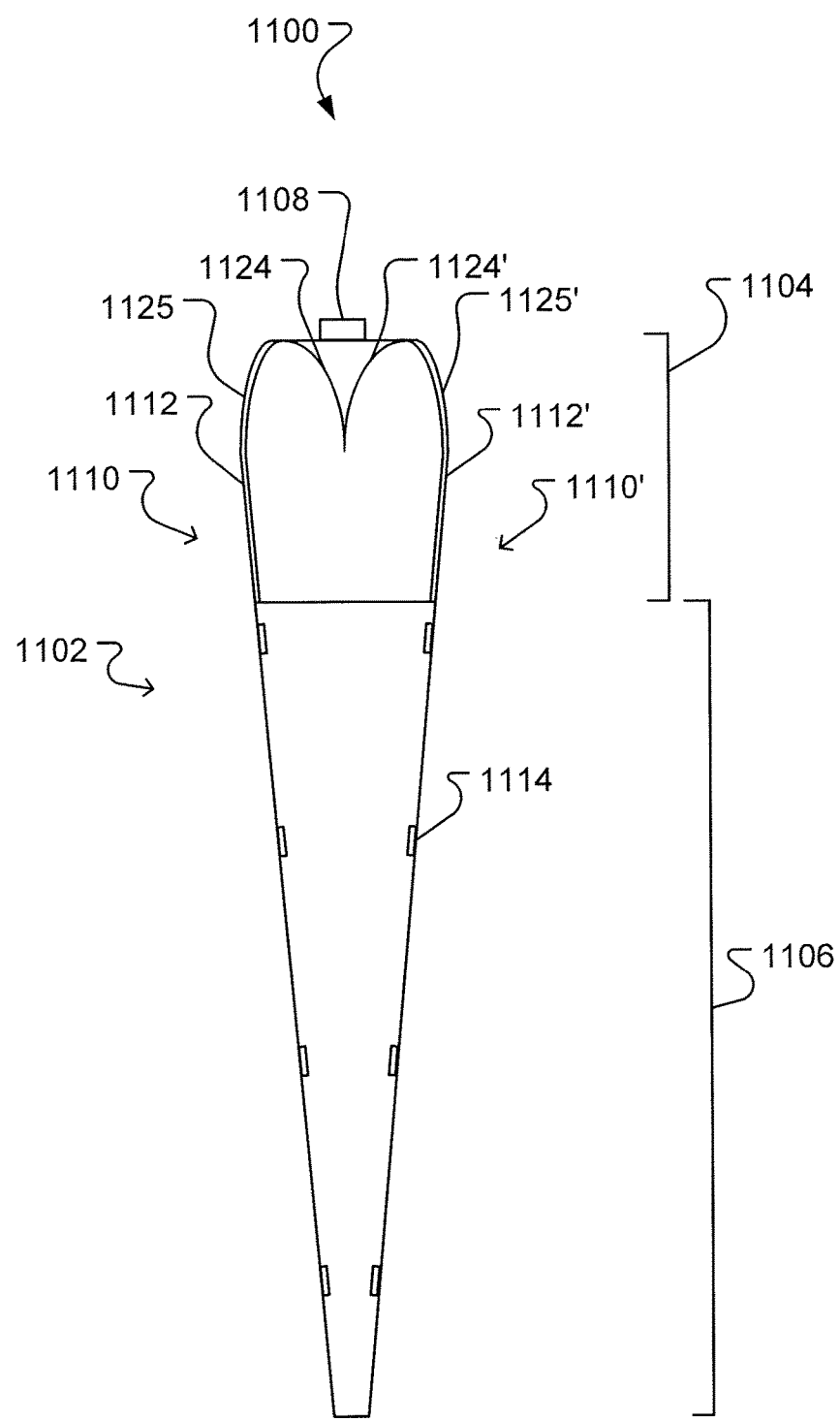
FIG. 32 is a side view of a light emitting panel assembly according to an embodiment of the invention.

FIG. 32 shows a light emitting panel assembly 1100 according to another embodiment of the invention. Light emitting panel assembly 1100 includes a light guide 1102, transition area 1104, emission area 1106, light source 1108, opposing major sides 1110, 1110' with corresponding corrugations or flutes 1112, 1112', and extraction elements 1114. Light guide 1102 narrows in the direction away from light source 1108 to aid in extraction of light at emission area 1106. In some embodiments flutes 1112,1112' may extend beyond transition area 1104 into emission area 1106. In other embodiments the light guide has generally parallel major sides.

Figure 33:
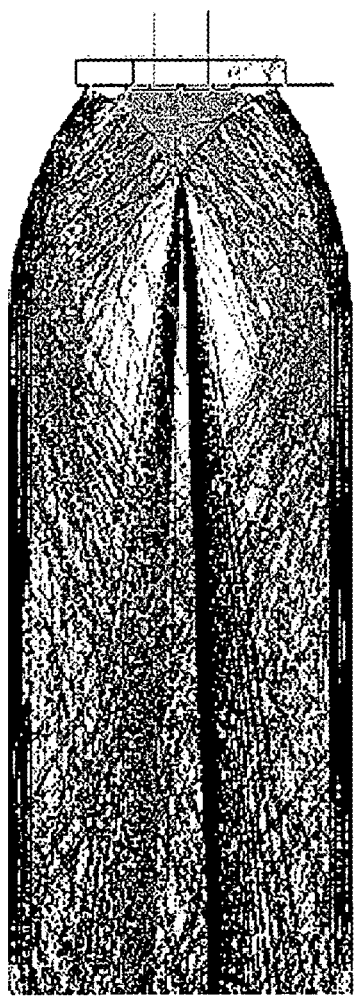
FIG. 33 is a partial side view of simulated light ray traces within a light emitting panel assembly according to an embodiment of the invention.
Figure 34:
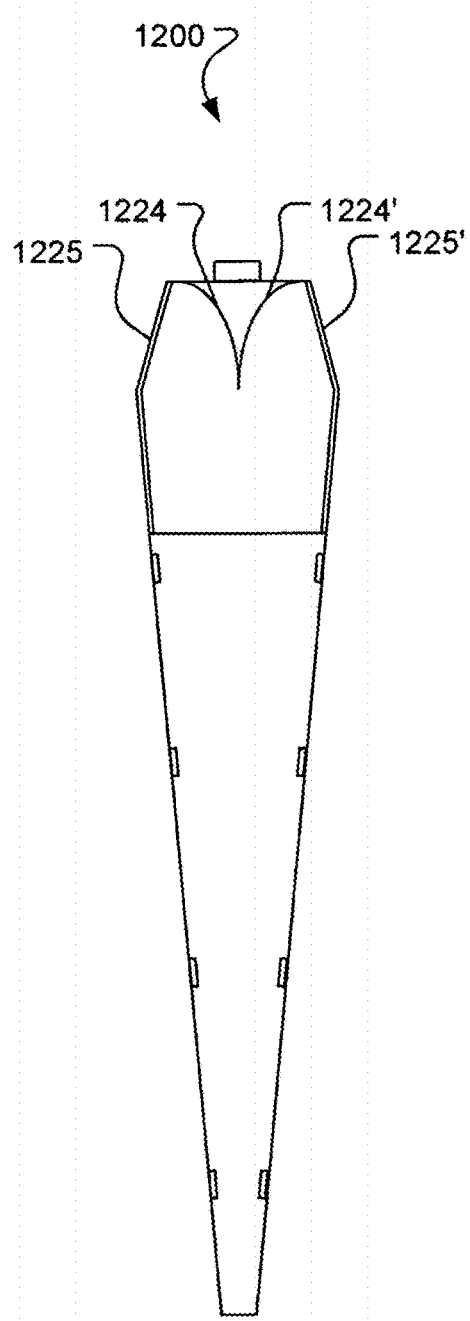
FIG. 34 is a side view of a light emitting panel assembly according to an embodiment of the invention.

Light emitted from light source 1108 enters transition area 1104 through a convex light receiving surfaces 1124,1124' configured in a V-shape. The convexity of receiving surfaces 1124,1124' refracts light entering transition area 1104 from light source 1108 toward the fluted major sides 1110,1110' respectively. Upper outer surfaces 1125,1125' may also be convex to ensure substantially total internal reflection. In other embodiments, the receiving surfaces and/or the upper outer surfaces may have flat sides; for example, as shown in FIG. 34, light emitting panel assembly 1200, which is similar to light emitting panel assembly 1100, receiving surfaces 1224,1224' are convex while upper outer surfaces 1225,1225' are flat. FIG. 33 shows optically simulated light ray traces in a light emitting panel assembly according to example embodiments of the invention similar to light emitting panel assembly 1100.

Similar to light emitting panel assembly 400, other embodiments of the light emitting panel assemblies of the invention, including those described above, may comprise, instead of a transition area where the flutes are formed as part of a solid core, a transition area comprising one or more films on which flutes are provided and bonded to the core. In yet other embodiments, light emitting panel assemblies of the invention may comprise a hollow core, with horizontal diffusion of light achieved by vertically extending reflective ribs, ridges or the like disposed on the interior of the major sides of the transition area.

Figure 35A:
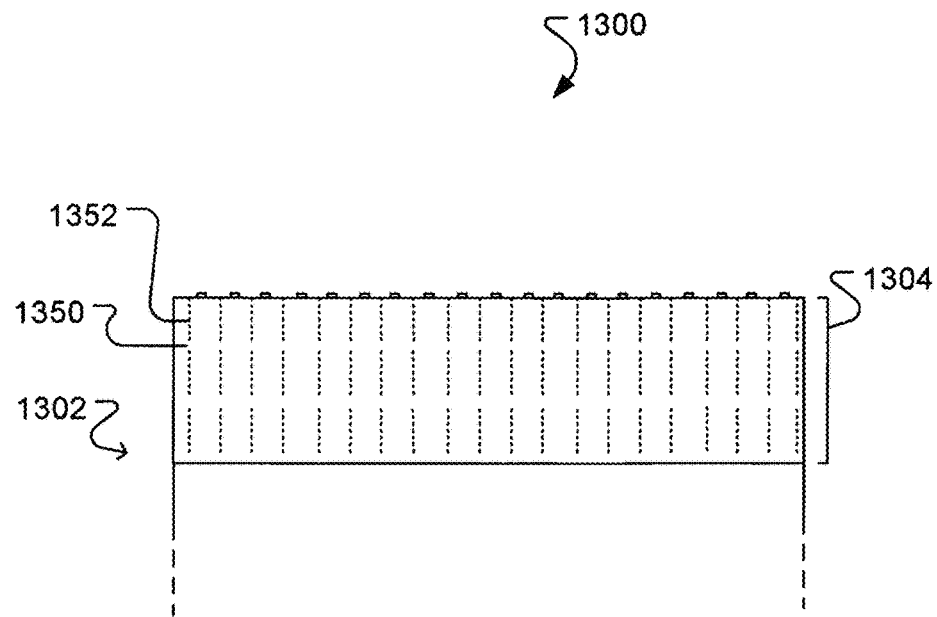
FIGS. 35A and 35B are front and side views of a light emitting panel assembly according to an embodiment of the invention.
Figure 35B:
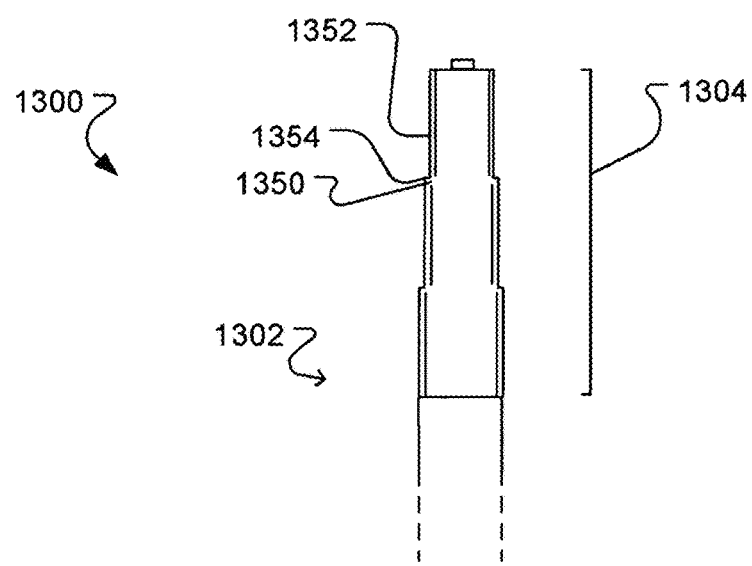

In the illustrated embodiments, the vertical span of the individual flutes in the transition area is continuous. In some embodiments the vertical span of the individual flutes in the transition area may be non-continuous. For example, light emitting panel assembly 1300 shown in FIG. 35A has individual flutes in transition area 1304 may be separated by one or more non-fluted segments 1350 into a plurality of flute segments 1352 as shown in light guide 1302 in FIG. 35A. In some embodiments, as shown in FIG. 35B, light loss at non-fluted segments 1350 may be minimized or eliminated by increasing the thickness of light guide 1302, for example in a stepped manner by steps 1354 at each non-fluted segment 1350. In other embodiments the thickness of light glide 1302 may be constant.

In embodiments of light emitting panel assemblies of the invention wherein the flutes extend into a region of the emission area, such region of the emission area may or may not have extraction elements. In such embodiments where extraction elements are absent, light may be extracted by a narrowing of the thickness of the emission area in the direction away from the light source. In some embodiments, whether or not extraction elements are present, the transition area may not have flutes, i.e., only the emission area may have flutes.

In some embodiments of light emitting panel assemblies wherein the flutes are limited to the transition area (i.e. do not extend into a region of the emission area), extraction elements may be absent from the emission area. In such embodiments where extraction elements are absent, light may be extracted by a narrowing of the thickness of the emission area in the direction away from the light source.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The invention claimed is:

1. A light emitting panel assembly comprising:
a first light source;
a second light source;
a light guide comprising a first transition area in optical communication with the first light source, a second transition area in optical communication with the second light source, and an emission area;
each of the first and second transition areas comprising a first major side and a second major side, wherein at least one of the first major side and the second major side comprises a plurality of vertically extending flutes, wherein the flutes extend at least a portion of the height of the transition area; and
the emission area in optical communication with each of the first and second transition areas at a common end of the emission area, the emission area comprising light extraction elements;
wherein each of the first and second transition areas comprises a non-straight path between a respective one of the first and second light source and an interface of the transition area and the emission area, the non-straight path comprising a curved portion integrally formed and continuous with the rest of the transition area, whereby the curved portion is dimensioned such that substantially all light from the light source internally reflects off at least one of the major sides of the transition area before entering the emission area;
wherein the first transition area and the second transition area are positioned in mirrored configuration to, together with the emission area, form a "Y-shaped" cross-section.

2. The light emitting panel assembly according to claim 1, wherein the first major side and the second major side comprise the flutes.

3. The light emitting panel assembly according to claim 2, wherein the flutes span substantially the height of the transition area.

4. The light emitting panel assembly according to claim 3 wherein each of the first and second light sources comprises a plurality of light sources.

5. The light emitting panel assembly according to claim 4 wherein a width of the flutes is equal to or less than the pitch of the light sources.

6. The light emitting panel assembly according to claim 1 wherein the emission area comprises a first major side and a second major side, and wherein at least one of the first major side and the second major side of the emission area comprises a plurality of vertically extending flutes, wherein the flutes extend at least a portion of the height of the emission area.

7. The light emitting panel assembly according to claim 6, wherein the flutes of the first and the second transition areas are continuous with the flutes of the emission area.

8. The light emitting panel assembly according to claim 1, wherein a degree of bend of the non-straight path is defined by an angle θ between a plane of a surface of the first and the second transition areas that initially receives light from the light source and a plane of an interface of the first and the second transition areas and the emission area, wherein the angle θ is in the range of about 30 degrees to 90 degrees.

9. The light emitting panel assembly according to claim 1, wherein a radius of an outer side of the curved portion is substantially equal to or greater than a critical radius of the outer side of the curved portion.

10. The light emitting panel assembly according to claim 1 wherein the inner side of the curved portion has a greater curvature than the outer side of the curved portion that would result in a substantially concentric curved portion.

11. The light emitting panel assembly according to claim 1 wherein the inner side of the curved portion begins at a point above a point where the outer side of the curved portion begins.

12. The light emitting panel assembly according to claim 1 wherein a thickness of the curved portion increases in a direction away from the light source.

13. The light emitting panel assembly according to claim 1, wherein a degree of bend of the non-straight path is defined by an angle θ between a plane of a surface of the first and the second transition areas that initially receives light from the light source and a plane of an interface of the first and the second transition areas and the emission area, wherein the angle θ is in the range of about 30 degrees to 90 degrees.

14. The light emitting panel assembly according to claim 1, wherein the first light source is in staggered configuration with the second light source.

15. The light emitting panel assembly according to claim 1 wherein each of the first and second transition areas comprises a hollow core and the flutes comprise vertically extending ribs or ridges disposed along interior surfaces of the first and second major surfaces.

16. The light emitting panel assembly according to claim 1 wherein the flutes are continuous in their vertical extent.

17. The light emitting panel assembly according to claim 1 wherein the first and second light sources are LEDs.

18. A luminaire comprising a light emitting panel assembly according to claim 1.

19. The light emitting panel assembly according to claim 1 wherein the flutes comprise a uniform lateral cross-section along their entire vertical extent.

20. The light emitting panel assembly according to claim 1 wherein the first light source is in an opposing facing relationship with the second light source.

21. The light emitting panel assembly comprising:
a light source;
a transition area comprising a first major side and a second major side, wherein both the first major side and the second major side each comprise a plurality of vertically extending flutes, wherein the flutes extend at least a portion of the height of the transition area; and
an emission area in optical communication with the transition area, the emission area comprising light extraction elements,
wherein the transition area comprises a "V-shaped" light receiving surface in optical communication with the light source,
wherein the flutes extend from opposing ends of the "V-shaped" light receiving surface.

22. The light emitting panel assembly according to claim 21, wherein each inner side of the "V-shaped" light receiving surface is convex.

23. The light emitting panel assembly according to claim 21, wherein each outer side of the "V-shaped" light receiving surface is convex.

* * * * *